US012067935B2

(12) United States Patent
Hou et al.

(10) Patent No.: US 12,067,935 B2
(45) Date of Patent: Aug. 20, 2024

(54) DISPLAY COMPENSATING METHOD, DISPLAY COMPENSATING DEVICE, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Yifan Hou, Beijing (CN); Tiankuo Shi, Beijing (CN); Zhihua Ji, Beijing (CN); Xiaomang Zhang, Beijing (CN); Xin Duan, Beijing (CN); Wei Sun, Beijing (CN); Tao Yang, Beijing (CN); Chenxi Zhao, Beijing (CN); Xiangjun Peng, Beijing (CN); Shuo Zhang, Beijing (CN); Minglei Chu, Beijing (CN); Yan Sun, Beijing (CN); Yanhui Xi, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/762,695

(22) PCT Filed: May 7, 2021

(86) PCT No.: PCT/CN2021/092098
§ 371 (c)(1),
(2) Date: Aug. 4, 2022

(87) PCT Pub. No.: WO2022/160496
PCT Pub. Date: Aug. 4, 2022

(65) Prior Publication Data

US 2024/0054950 A1 Feb. 15, 2024

(30) Foreign Application Priority Data

Jan. 28, 2021 (CN) ......................... 202110117897.6

(51) Int. Cl.
*G09G 3/3258* (2016.01)
*G09G 3/3208* (2016.01)
*H01L 27/32* (2006.01)

(52) U.S. Cl.
CPC ... *G09G 3/3208* (2013.01); *G09G 2320/0233* (2013.01); *G09G 2320/0242* (2013.01); *G09G 2320/041* (2013.01); *G09G 2360/16* (2013.01)

(58) Field of Classification Search
CPC ............................................... G09G 2320/041
See application file for complete search history.

(56) References Cited

U.S. PATENT DOCUMENTS

2007/0285377 A1 12/2007 Yamazaki
2010/0079361 A1 4/2010 Lee et al.
(Continued)

FOREIGN PATENT DOCUMENTS

CN 105096834 A 11/2015
CN 105469740 A 4/2016
(Continued)

OTHER PUBLICATIONS

CN 202110117897.6 first office action.
PCT/CN2021/092098 international search report and written opinion.

*Primary Examiner* — Nan-Ying Yang
(74) *Attorney, Agent, or Firm* — IPro, PLLC

(57) ABSTRACT

A display compensating method, display compensating device, and display device are provided, which relates to field of display and addresses the issues of poor screen uniformity, grayscale relationship change of sub-pixel due to ambient temperature change, and display screen brightness
(Continued)

affected by ageing offset of threshold voltage corresponding to the sub-pixel. The display compensating method is applied to the display device, including: converting a received grayscale signal into a brightness signal; performing an optical compensation on a display brightness of the display device based on the brightness signal; converting a corresponding brightness signal on which the optical compensation is performed into a voltage signal; compensating for a threshold voltage corresponding to each sub-pixel in the display device based on the voltage signal; and compensating for operating parameters of the display device for the display device at different operating temperatures.

18 Claims, 5 Drawing Sheets

(56) References Cited

U.S. PATENT DOCUMENTS

| | | | | |
|---|---|---|---|---|
| 2016/0335958 | A1* | 11/2016 | Huang | G02F 1/133621 |
| 2017/0193909 | A1 | 7/2017 | Song et al. | |
| 2018/0330669 | A1 | 11/2018 | Zheng | |
| 2019/0108792 | A1 | 4/2019 | Hwang et al. | |
| 2019/0147801 | A1* | 5/2019 | Chu | G09G 3/3233<br>345/76 |
| 2019/0164475 | A1 | 5/2019 | Zhao | |

FOREIGN PATENT DOCUMENTS

| | | | |
|---|---|---|---|
| CN | 106847157 | A | 6/2017 |
| CN | 106875889 | A | 6/2017 |
| CN | 106910461 | A | 6/2017 |
| CN | 107610649 | A | 1/2018 |
| CN | 107799066 | A | 3/2018 |
| CN | 108877678 | A | 11/2018 |
| CN | 109036268 | A | 12/2018 |
| CN | 109949748 | A | 6/2019 |
| CN | 112133252 | A | 12/2020 |
| KR | 20140073322 | A | 6/2014 |
| KR | 101498094 | B1 | 3/2015 |
| KR | 20180014333 | A | 2/2018 |

* cited by examiner

DISPLAY COMPENSATING METHOD, DISPLAY COMPENSATING DEVICE, AND DISPLAY DEVICE

CROSS REFERENCE TO RELATED APPLICATIONS

This application is the U.S. national phase of PCT Application No. PCT/CN2021/092098 filed on May 7, 2021, which claims priority to Chinese Patent Application No. 202110117897.6 filed in China on Jan. 28, 2021, the disclosure of which is incorporated hereby by reference in its entirety.

TECHNICAL FIELD

The present disclosure relates to the technical field of displaying, and in particular, to a display compensating method, a display compensating device, and a display device.

BACKGROUND

Displays with high resolution organic light emitting diode (English: Organic Light-Emitting Diode, hereinafter referred to as: OLED) are key techniques in screen display industry nowadays. While the OLED display screen is self-light-emitting, there are some issues, such as poor screen uniformity, a change in grayscale relationship of a sub-pixel due to a change in the ambient temperature, and the screen brightness affected by an aging offset of a threshold voltage corresponding to the sub-pixel. Current display compensation schemes for the OLED display screen are mainly for large-size OLED display screen, and incomplete compensation consideration results in a display precision to be improved, and the cost is greatly increased due to non-self-developed technology. Therefore, there is a need for an overall scheme for display compensation to address the above-mentioned technical issues while ensuring the display precision and reducing costs.

SUMMARY

The present disclosure is to provide a display compensating method, a display compensating device, and display device.

In order to achieve this, the present disclosure provides the following technical solutions:

In first aspect of the present disclosure, a display compensating method applied to a display device is provided, the display compensating method including:

converting a received grayscale signal into a brightness signal;

performing an optical compensation on a display brightness of the display device based on the brightness signal;

converting a corresponding brightness signal after the optical compensation is performed into a voltage signal;

compensating for a threshold voltage corresponding to each sub-pixel in the display device based on the voltage signal; and compensating for operating parameters of the display device for the display device at different operating temperatures.

Optionally, the step of compensating for the operating parameters of the display device for the display device at different operating temperatures specifically includes:

determining first compensation values corresponding to data signals of a sub-pixel of the first colour in the display device for the display device at different operating temperatures, and generating a first compensation look-up table between the operating temperatures, the data signals and the first compensation values corresponding to the sub-pixel of the first colour;

determining a current operating temperature of the display device and a data signal received by the sub-pixel of the first colour;

determining, according to the first compensation look-up table, a first compensation value corresponding to the data signal received by the sub-pixel of the first colour at the current operating temperature; and compensating the data signal received by the sub-pixel of the first colour by using said first compensation value, so as to obtain a first target data signal corresponding to the sub-pixel of the first colour.

Optionally, the step of compensating for the operating parameters of the display device for the display device at different operating temperatures specifically includes:

determining a first correspondence between cathode potentials and operating temperatures for the display device within a standard operating temperature; determining a high-temperature cathode potential for the display device at a high operating temperature, the high operating temperature being greater than the highest temperature of the standard operating temperature range;

detecting the operating temperature of the display device for multiple times.

In a case that an operating temperature of a current detection is within the standard operating temperature range:

when the operating temperature of the current detection is equal to an operating temperature of a most recent detection, keeping the cathode potential of the display device unchanged;

when the operating temperature of the current detection is not equal to the operating temperature of the most recent detection, determining, according to the first correspondence, a current cathode potential corresponding to the operating temperature of the current detection and a last cathode potential corresponding to the operating temperature of the most recent detection;

determining a potential difference value between the current cathode potential and the last cathode potential, and in a case where an absolute value of the potential difference value is less than a preset step value, determining that the cathode potential of the display device is the current cathode potential; in a case where the potential difference value is greater than or equal to the step value, and when the operating temperature of the current detection is greater than the operating temperature of the most recent detection, determining that the cathode potential of the display device at a current frame is $VSS(F_{n-1})+stepV$, in a case where the potential difference value is greater than or equal to the step value, and when the operating temperature of the current detection is less than the operating temperature of the most recent detection, determining that the cathode potential of the display device at the current frame is $VSS(F_{n-1})-stepV$; wherein the $VSS(F_{n-1})$ is a corresponding cathode potential of the display device at a previous frame adjacent to the current frame, and stepV is the step value;

in a case where the operating temperature of the current detection is regarded as the high operating temperature, controlling the display device to display a black image, and in the process of displaying the black image, controlling the cathode potential of the display device to change to the high-temperature cathode potential; and in a case that the operating temperature of the current detection is lower than the lowest temperature of the standard operating temperature range, controlling the cathode potential of the display device to change to a cathode potential corresponding to the lowest operating temperature of the standard operating temperature range.

Optionally, the step of compensating for the operating parameters of the display device for the display device at different operating temperatures specifically includes:

determining a second correspondence between gamma look-up tables and operating temperatures for a sub-pixel of a first colour in the display device within a standard operating temperature range; determining a high-temperature gamma look-up table corresponding to the sub-pixel of the first colour at the high operating temperature;

detecting the operating temperature of the display device for multiple times.

In a case that the operating temperature of the current detection is within the standard operating temperature range:

when the operating temperature of the current detection is equal to the operating temperature of the most recent detection, keeping a gamma look-up table corresponding to the sub-pixel of the first colour remaining unchanged;

when the operating temperature of the current detection is not equal to the operating temperature of the most recent detection, and when the absolute value of the potential difference value is less than a preset step value, determining, according to the second correspondence, that the gamma look-up table corresponding to the sub-pixel of the first colour is a gamma look-up table corresponding to the operating temperature of the current detection; hen the operating temperature of the current detection is not equal to the operating temperature of the most recent detection, and when the absolute value of the potential difference value is greater than or equal to the step value, adjusting the gamma look-up table corresponding to the sub-pixel of the first colour to be a target gamma look-up table; where for the target gamma look-up table: a linear brightness column in a gamma look-up table corresponding to the sub-pixel of the first colour at a current frame is kept unchanged, and in a data signal column, a data signal of each order $Vdata(F_n)$ is calculated according to the following linear difference value:

$$\frac{VSS(F_n)-VSS(F_{n-1})}{VSS(T_n)-VSS(F_{n-1})}=\frac{Vdata(F_n)-Vdata(F_{n-1})}{Vdata(T_n)-Vdata(F_{n-1})}$$

where $VSS(T_n)$ is a current cathode potential corresponding to the display device at the operating temperature of the current detection, $VSS(F_n)$ is a cathode potential corresponding to the display device at the current frame, $VSS(F_{n-1})$ is a cathode potential corresponding to the display device at the most recent frame, $Vdata(T_n)$ is a data signal of each order corresponding to the sub-pixel of the first colour at the operating temperature of the current detection, $Vdata(F_n)$ is a data signal of each order corresponding to the sub-pixel of the first colour at the current frame, and $Vdata(F_{n-1})$ is a data signal of each order corresponding to the sub-pixel of the first colour on the most recent frame;

in the case where the operating temperature of the current detection is regarded as the high operating temperature, adjusting the gamma look-up table corresponding to the sub-pixel of the first colour to be the high-temperature gamma look-up table; and in the case where the operating temperature of the current detection is lower than the lowest temperature of the standard operating temperature range, controlling the gamma look-up table corresponding to the sub-pixel of the first colour to change to a gamma look-up table corresponding to the lowest operating temperature of the standard operating temperature range.

Optionally, the step of compensating for the threshold voltage corresponding to each sub-pixel in the display device specifically includes:

determining a third correspondence between compensatory threshold voltages and compensatory data voltages of the sub-pixel of the first colour in the display device;

testing an initial threshold voltage of the sub-pixel of the first colour in the display device;

monitoring an actual threshold voltage of the sub-pixel of the first colour during operation of the display device, and determining an compensatory threshold voltage of the sub-pixel of the first colour according to the actual threshold voltage and the initial threshold voltage;

determining, according to the third correspondence and based on the compensatory threshold voltage of the sub-pixel, a compensatory data voltage of a sub-pixel of the first colour;

compensating for a first target data signal corresponding to the sub-pixel of the first colour by using the compensatory data voltage, to obtain a second target data signal; and where the sub-pixel of the first colour in the display device displays based on the second target data signal.

Optionally, the display compensating method further includes:

storing the second target data signal corresponding to each sub-pixel at a frame before the display device is in a power-failure state, for use by the display device when being in a next power-on state.

Optionally, in the step of compensating for the threshold voltage corresponding to each sub-pixel in the display device:

the display device is divided into a plurality of blocks arranged in an array, where each block includes a plurality of sub-pixels of the first colour, and each block corresponds to one compensatory data voltage;

a target block to which a compensatory sub-pixel of the first colour in the display device belongs, a first block, a second block and a third block that are closest to the compensatory sub-pixel are arranged in an array of 2*2;

a distance between the compensatory sub-pixel and a center point of the target block is D1;

a distance between the compensatory sub-pixel and a center point of the first block is D2;

a distance between the compensatory sub-pixel and a center point of the second block is D3; and a distance between the compensatory sub-pixel and a center point of the third block is D4;

The compensatory data voltage y of the compensatory sub-pixel is:

$$y = \frac{y_1' * L_4' + y_2' * L_3' + y_3' * L_2' + y_4' * L_1'}{L_1' + L_2' + L_3' + L_4'}$$

$L'_1$ is a minimum value in D1, D2, D3 and D4;

$L'_4$ is maximum values in D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

$y'_1$ is a compensatory data voltage of a block corresponding to the minimum value;

$y'_2$ is a compensatory data voltage of a block corresponding to the smaller value;

$y'_3$ is a compensatory data voltage of a block corresponding to the larger value;

$y'_4$ is a compensatory data voltage of a block corresponding to the maximum value; and compensating for a first target data signal corresponding to the compensatory sub-pixel by using a compensatory data voltage, to obtain a second target data signal; wherein the compensatory sub-pixel displays based on the second target data signal.

Optionally, the step of converting the received grayscale signal into the brightness signal; and performing the optical compensation on the display brightness of the display device based on the brightness signal specifically includes:

providing at least two sets of first grayscale signals to the display device;

obtaining an actual brightness and a target brightness of the sub-pixel of the first colour corresponding to each of the at least two sets of first grayscale signal in a case that a lens is not added to the display device and obtaining at least two first relationship equations corresponding to the sub-pixel of the first colour, z1=a1*x+b1; where x represents the actual brightness, z1 represents the target brightness, a1 represents a first optical compensation factor, b1 represents a first optical offset; and obtaining at least one set of a1 and b1 according to the at least two first relationship equations;

providing at least two sets of second grayscale signals to the display device;

obtaining a to-be-displayed brightness of the sub-pixel of the first colour corresponding to each of the at least two sets of second grayscale signals in a case that a lens is not added to the display device; performing, based on the to-be-displayed brightness, a sub-pixel rendering on the sub-pixel to obtain a first applied display brightness of the sub-pixel of the first colour corresponding to each of the at least two sets of second grayscale signals substituting the first applied display brightness into x of the first relationship equation to obtain a first modified brightness z1' of the sub-pixel of the first colour in the display device corresponding to each of the at least two sets of second grayscale signals, z1'=a1*x+b1;

obtaining an actual brightness of each of the at least two sets of second grayscale signals corresponding to the sub-pixel of the first colour in a case that a lens is added to the display device; determining, according to the actual brightness, a target brightness of the sub-pixel of the first colour corresponding to each of the at least two sets of second grayscale signals; performing, based on the target brightness, a sub-pixel rendering on the sub-pixel to obtain a second applied display brightness of the sub-pixel of the first colour corresponding to each of the at least two sets of second grayscale signals;

substituting the second applied display brightness into x of the first relationship equation to obtain a second modified brightness z1" of the sub-pixel of the first colour in the display device corresponding to each of the at least two sets of second grayscale signals, z1"=a1*x+b1;

obtaining, based on the first modified brightness and the second modified brightness of the sub-pixel of the first colour corresponding to each of the at least two sets of second grayscale signals, at least two second relationship equations corresponding to the sub-pixel of the first colour, z1"=a2*z1'+b2; where z1' represents the first modified brightness, z1" represents the second modified brightness, a2 represents a second optical compensation factor, b2 represents a second optical offset; obtaining at least one set of a2 and b2 according to the at least two second relationship equations; and substituting z1=a1 *x+b1 into z1' of z1"=a2*z1'+b2 to obtain z1"=ax+b; where a=a1*a2, b=a2*b1+b2, a represents a third optical compensation factor, b represents a third optical offset.

Optionally, in the step of performing an optical compensation on the display brightness of the display device based on the brightness signal:

the display device is divided into a plurality of blocks arranged in an array, where each block includes a plurality of sub-pixels of a first colour, and each block corresponds to one second modified brightness;

a target block to which a compensatory sub-pixel of the first colour in the display device belongs, a first block, a second block and a third block that are closest to the compensatory sub-pixel distributing in an array of 2*2;

a distance between the compensatory sub-pixel and a center point of the target block is D1;

a distance between the compensatory sub-pixel and a center point of the first block is D2;

a distance between the compensatory sub-pixel and a center point of the second block is D3; and a distance between the compensatory sub-pixel and a center point of the third block is D4;

where the second modified brightness z2 for the compensatory sub-pixel that is compensated for is:

$$z2 = \frac{z11'' * L_4' + z12'' * L_3' + z13'' * L_2' + z14'' * L_1'}{L_1' + L_2' + L_3' + L_4'}$$

$L'_1$ is a minimum value in D1, D2, D3 and D4;

$L'_4$ is a maximum value in D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

z11" is a second modified brightness of a block corresponding to the minimum value;

z12" is a second modified brightness of a block corresponding to the smaller value;

z13" is a second modified brightness of a block corresponding to the larger value; and z14" is a second modified brightness of a block corresponding to the maximum value.

Based on the technical solution of the above-mentioned display compensating method, in a second aspect of the present disclosure, a display compensating device is provided, including:

a first conversion module, configured to convert a received grayscale signal into a brightness signal;

an optical compensation module, configured to perform an optical compensation on the display brightness of display device based on the brightness signal;

a second conversion module, configured to convert a corresponding brightness signal on which the optical compensation is performed into a voltage signal; and an electrical compensation module, configured to compensate for the threshold voltage corresponding to each sub-pixel in the display device based on the voltage signal; and compensate for operating parameters of the display device for the display device at different operating temperatures.

Based on the technical solution of the above-mentioned display compensating device, in a third aspect of the present disclosure, a display device including the above-mentioned display compensating device is provided.

Based on the technical solution of the above-mentioned display compensating method, in a fourth aspect of the present disclosure, a display device is provided, including: a processor and a memory, the memory storing computer executable instructions, the computer executable instructions, when being executed by the processor, cause the processor to perform the above-mentioned display compensating method.

Based on the technical solution of the above-mentioned display compensating method, in a fifth aspect of the present disclosure, a non-volatile storage medium is provided, the non-volatile storage medium stores computer executable instructions, the computer executable instructions, when being executed by a processor, cause the processor to perform the above-mentioned display compensating method.

BRIEF DESCRIPTION OF THE DRAWINGS

The accompanying drawings provide a further understanding of the disclosure and constitute a part of this disclosure, and illustrative embodiments of the disclosure and the description thereof serve to explain the disclosure and do not constitute an undue limitation of the disclosure. In the drawings.

DETAILED DESCRIPTION

In order to further explain the display compensating method, the display compensating device and the display device provided by embodiments of the present disclosure, the following detailed description is made in conjunction with the accompanying drawings.

Figure 1:
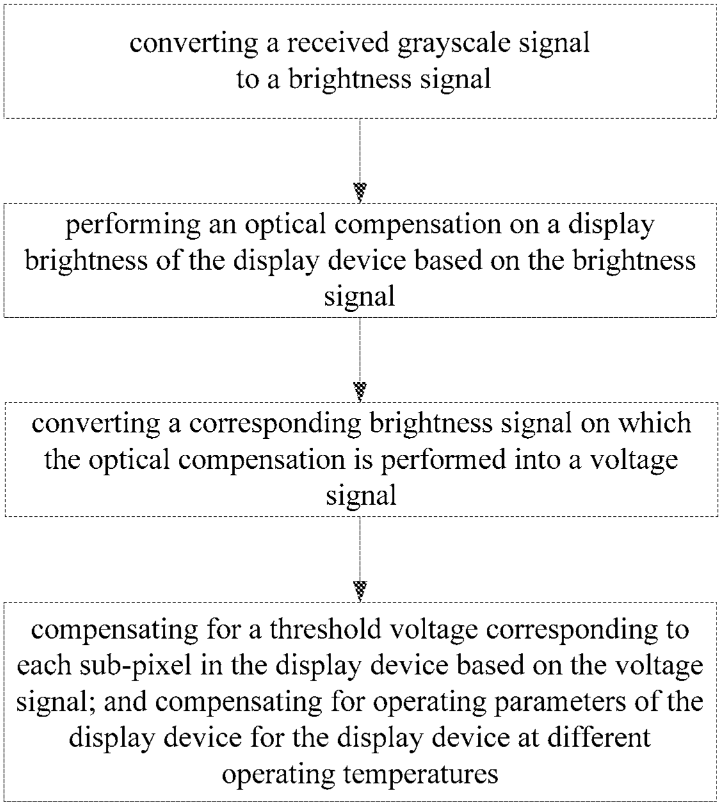
FIG. 1 is a first flow diagram of the display compensating method provided by an embodiment of the present disclosure.

With reference to FIG. 1, an embodiment of the present disclosure provides a display compensating method, applied to a display device, where the display compensating method includes:

converting a received grayscale signal into a brightness signal;

performing an optical compensation on a display brightness of the display device based on the brightness signal;

converting a corresponding brightness signal on which optical compensation is performed into a voltage signal;

compensating for a threshold voltage corresponding to each sub-pixel in the display device based on the voltage signal; and compensating for operating parameters of the display device for the display device at different operating temperatures.

Illustratively, the display compensating method provided by the embodiment of the present disclosure can be applied to an OLED display device of pixel island structure.

Illustratively, the display compensating method includes a user usage mode and a test mode. In the user usage mode: a GPU (image processor) end verification module outputs grayscale data to a chip in the display device, the chip implements all the steps included in the display compensating method, and controls the display device to perform the display compensation. In test mode: GPU performs operations such as: converts nonlinear grayscale domain into linear brightness domain; performs an optical compensation on display brightness of the display device in the linear brightness domain; and converts the linear brightness domain into a non-linear voltage domain. After the GPU completes the above-mentioned operations, a data signal is outputted to a chip, and the chip directly performs a compensation on the threshold voltage corresponding to each sub-pixel in the display device in the non-linear voltage domain and compensates for the operating parameters of the display device for the display device at different operating temperatures.

It is noted that in the test mode, the GPU can obtain an optimized optical compensation effect through continuous debugging, and an optimized compensation parameter corresponding to the optimized optical compensation effect is written into the chip in the next use, so that the chip can realize the display compensation based on the optimized compensation parameter.

Illustratively, both the GPU and the chip include a Degamma EOTF (Electro-Optical Transfer Function) module, and the Degamma EOTF module can convert a received grayscale signal into a brightness signal, so as to convert a non-linear grayscale domain into a linear brightness domain to cause an optical compensation process to be performed in the linear brightness domain, namely, the optical compensation is performed on a display brightness of the display device based on the brightness signal.

Illustrative, the optical compensation performed in the linear brightness domain includes: a colour gamut mapping, a pixel island SPR (sub-pixel rendering), a brightness compensation, etc.

It is noted that the optical compensation is performed in linear brightness domain, so that an influence on optical compensation parameters in a case that the maximum screen brightness changes can be effectively avoided.

Illustratively, both the GPU and the chip include a gamma OETF (Opto-Electronic Transfer Function) module, and the gamma OETF module can convert the brightness signal, which is obtained after optical compensation is performed, into a voltage signal, so as to convert the linear brightness domain into a non-linear voltage domain, thereby both a subsequent compensation for the threshold voltage and a subsequent compensation for the operating parameters can be implemented in the non-linear voltage domain. The gamma OETF module can also select a corresponding gamma LUT (Look-Up Table) according to a measured temperature.

In the display compensating method provided by embodiments of the present disclosure, the display device can be optically compensated in the linear brightness domain, and the threshold voltage corresponding to each sub-pixel in the display device can be compensated in the non-linear voltage domain, and the operating parameters of the display device at different operating temperatures can be compensated. Therefore, the display compensating method provided by embodiments of the present disclosure realizes a general and overall compensation for the display device in the linear brightness domain and the non-linear voltage domain, and addresses the following issues of a display screen while ensuring the display precision and reducing costs: a poor screen uniformity, a change in a grayscale relationship of a sub-pixel due to a change in the ambient temperature, and the screen brightness affected by an aging offset of a threshold voltage corresponding to the sub-pixel.

Figure 2:
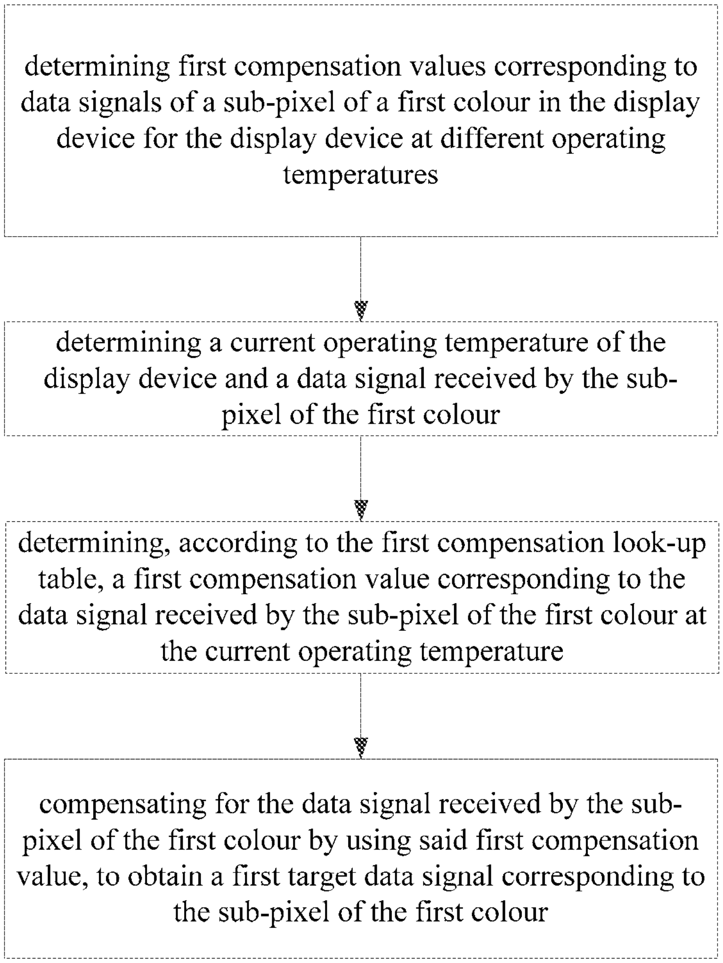
FIG. 2 is a second flow diagram of the display compensating method provided by an embodiment of the present disclosure.

As shown in FIG. 2, in some embodiments, the step of compensating for the operating parameters of the display device for the display device at different operating temperatures specifically includes:

- determining first compensation values corresponding to data signals of a sub-pixel of a first colour in the display device for the display device at different operating temperatures, and generating a first compensation look-up table between the operating temperatures, the data signals and the first compensation values corresponding to the sub-pixel of the first colour;
- determining a current operating temperature of the display device and a data signal received by the sub-pixel of the first colour;
- determining, according to the first compensation look-up table, a first compensation value corresponding to the data signal received by the sub-pixel of the first colour at the current operating temperature; and
- compensating for the data signal received by the sub-pixel of the first color by using the first compensation value, to obtain a first target data signal corresponding to the sub-pixel of the first color; the sub-pixel of the first color displays based on the first target data signal.

Illustratively, the sub-pixel of the first color includes one or more of: a red sub-pixel, a green sub-pixel, a blue sub-pixel and a white sub-pixel.

Illustratively, the first compensation look-up table is a two-dimensional look-up table, and when the two-dimensional look-up table is used, the first compensation value $\Delta Vdata_{temp}$ can be looked up according to the operating temperature and the data signal Vdata. Illustratively, the first compensation look-up table is stored in an external Flash memory.

Illustratively, a real-time detection is performed on the operating temperature of the display device. Illustratively, the operating temperature of the display device is detected with an interval of two frames. Illustratively, the operating temperature of the display device is checked every other frame. Illustratively, a frame refers to a frame display time of the display device.

Illustratively, the operating temperature may be an average temperature of the display device as a whole, or may be an operating temperature corresponding to the sub-pixel of the first color.

Illustratively, after a temperature change is determined according to the operating temperature of the current detection, a one-dimensional Vdata look-up table corresponding to the operating temperature of the current detection s read from the Flash memory, namely, a one-dimensional look-up table between the data signal Vdata and the first compensation value $\Delta Vdata_{temp}$ at the operating temperature of the current detection, overwrites a previous look-up table in a RAM (Random Access Memory).

Illustratively, all sub-pixels of the first color are traversed, and corresponding $\Delta Vdata_{temp}$ values (including positive and negative) are found by referring to the one-dimensional Vdata look-up table in the RAM, and the Vdata is compensated for to obtain the first target data signal $Vdata_{temp}=Vdata+\Delta Vdata_{temp}$.

In the display compensating method provided by said embodiments, data signals can be compensated for correspondingly with reference to the operating temperature of the display device, thereby facilitating a precise display of the display device at different operating temperatures.

In some embodiments, the step of compensating for the operating parameters of the display device for the display device at different operating temperatures specifically includes:

- determining a first correspondence between cathode potentials and operating temperatures for the display device within a standard operating temperature range;
- determining a high-temperature cathode potential of the display device at a high operating temperature, the high operating temperature is greater than the highest temperature in the standard operating temperature range;
- detecting the operating temperature of the display device for multiple times.
- in a case that the operating temperature of the current detection is within the standard operating temperature range:
- when the operating temperature of the current detection is equal to an operating temperature of the most recent detection, keeping the cathode potential of the display device unchanged;
- when the operating temperature of the current detection is not equal to the operating temperature of the most recent detection, determining, according to the first correspondence, a current cathode potential corresponding to the operating temperature of the current detection and a last cathode potential corresponding to the operating temperature of the most recent detection;
- determining a potential difference value between the current cathode potential and the last cathode potential, and in a case where an absolute value of the potential difference value is less than a preset step value, determining that the cathode potential of the display device is the current cathode potential; in a case where the potential difference value is greater than or equal to the step value, and when the operating temperature of the current detection is greater than the operating temperature of the most recent detection, determining that the cathode potential of the display device at the current frame is $VSS(F_{n-1})$+stepV, in a case where the potential difference value is greater than or equal to the step value, and when the operating temperature of the current detection is less than the operating temperature of the most recent detection, determining that the cathode potential of the display device at the current frame is $VSS(F_{n-1})$–stepV; where $VSS(F_{n-1})$ is the cathode potential of the display device at a previous frame adjacent to the current frame, and stepV is the step value.

in a case where the operating temperature of the current detection is regarded as the high operating temperature, controlling the display device to display a black image, and in the process of displaying the black image, controlling the cathode potential of the display device to change to the high-temperature cathode potential; and in a case that the operating temperature of the current detection is lower than the lowest temperature within the standard operating temperature range, controlling the cathode potential of the display device to change to a cathode potential corresponding to the lowest operating temperature within the standard operating temperature range.

Illustratively, at a factory setting stage, the display device is configured with a first correspondence between m groups of operating temperatures and cathode potentials of the display device within the standard operating temperature range SPEC (for example, the standard operating temperature range is from 25 degrees centigrade to 60 degrees centigrade); at the factory setting stage, the display device is configured with one group of a specific temperature and high-temperature cathode potential corresponding to the high operating temperature. Illustratively, temperatures higher than the highest temperature in the standard operating temperature range are all regards as the high operating temperature.

Illustratively, the operating temperature of the display device is detected in real time. Illustratively, the operating temperature of the display device is detected with an interval of two frames. Illustratively, the operating temperature of the display device is detected every other frame.

Illustratively, after the current operating temperature is determined, a determination is made as to the operating temperature of the current detection, to determine whether the operating temperature of the current detection is within the standard operating temperature range, or is regarded as the high operating temperature, or is regarded to a case that the operating temperature of the current detection is lower than the lowest temperature within the standard operating temperature range.

Illustratively, in a case where the operating temperature of the current detection is within the standard operating temperature range, a further determination as to whether the operating temperature of the current detection is equal to the operating temperature detected in a most recent detection is made, and if the operating temperature of the current detection is equal to the operating temperature detected in a most recent detection, the cathode potential of the display device corresponding to the current frame and the cathode potential of the display device corresponding to the most recent frame are equal; if the operating temperature of the current detection and the operating temperature detected in a most recent detection are not equal, a current cathode potential $VSS(T_n)$ corresponding to the operating temperature of the current detection and a last cathode potential $VSS(T_{n-1})$ corresponding to an operating temperature of most recent detection are determined according to the first correspondence, and an absolute value of a potential difference value $VSS(T_n)-VSS(T_{n-1})$ is compared with a preset step value (step amplitude) stepV.

If the absolute value of the difference between $VSS(T_n)$ and $VSS(T_{n-1})$ is greater than or equal to stepV, the cathode potential of the current frame takes $VSS(F_{n-1})\pm$stepV (if $T_n$ is greater than $T_{n-1}$, take positive, otherwise take negative), $VSS(F_{n-1})$ is the cathode potential of the most recent frame; if the difference between $VSS(T_n)$ and $VSS(T_{n-1})$ is less than stepV, the cathode potential of the current frame takes $VSS(T_n)$. Illustratively, stepV is equal to 10 mV.

Illustratively, the cathode potential can only be adjusted once per frame. In an example in which the temperature acquisition is performed with an interval of two frames (e.g., the temperature is obtained at the end of the third frame), a target cathode potential corresponding to the obtained temperature is determined to 80 mV through the first correspondence; the cathode potential of the display device before the third frame is determined to be 50 mV, then the cathode potential is adjusted to 50 mV+10 mV at the fourth frame, and the cathode potential is adjusted to 60 mV+10 mV at the fifth frame, so that at the fifth frame, the cathode potential is 70 mV which is close to 80 mV; then temperature acquisition is performed again at the end of frame of the fifth frame.

It is noted that in a case that the detected temperature changes from $T_{n-1}$ to $T_n$, theoretically, the cathode potential of display device should be changed to $VSS(T_n)$, and the gamma look-up table gamma $LUT(T_{n-1})$ should be changed to gamma $LUT(T_n)$. However, since the cathode potential of the display device throughout the screen is consistent, and the OLED screen is in the form of line scanning, when an amplitude of an abrupt change in the cathode potential is too large such that data signals for each line cannot be adjusted in time, the brightness of the whole screen is apt to be abruptly changed, the above-mentioned issue can avoid with a gradual change limitation to the cathode potential proposed by the disclosure.

Illustratively, in the case where the operating temperature of the current detection is regarded as the high operating temperature, a frame of black image (GL0) is introduced, and in the process of displaying the black image, the cathode potential of the display device is greatly reduced to a specific high-temperature cathode potential so as to reduce the power consumption of the display device; for the next one or more frames, the cathode potential of the display device remains at the high-temperature cathode potential as long as the temperature is not restored to be within the SPEC.

It is noted that in the case where the operating temperature of the current detection is lower than the lowest temperature of the standard operating temperature range, namely, when the detected operating temperature is too low, if the cathode potential is decreased too much, the display device is apt to be not dark enough at a low grayscale. Therefore, the cathode potential corresponding to the lowest temperature of the SPEC may be taken as the cathode potential in this state.

In the display compensating method provided by the above-mentioned embodiments, the cathode potential of the display device can be adjusted according to the change in the operating temperature of the display device, such that the adjustment of the cathode potential of the display device can be changed slowly within the SPEC, and the overall visual effect of the display device can transition smoothly. Furthermore, when the display device is at a high operating temperature or at a temperature lower than the SPEC, the cathode potential of the display device can also be adjusted accordingly, thereby further facilitating a precise display of the display device at different operating temperatures.

In some embodiments, the step of compensating for the operating parameters of the display device for the display device at different operating temperatures specifically includes:

determining a second correspondence between gamma look-up tables and the operating temperatures for a sub-pixel of a first colour in the display device within a standard operating temperature; determining a high-temperature gamma look-up table corresponding to the sub-pixel of the first colour at the high operating temperature;

detecting the operating temperature of the display device for multiple times.

in a case the operating temperature of the current detection is within the standard operating temperature range:

when the operating temperature of the current detection is equal to an operating temperature of the most recent detection, keeping the gamma look-up table corresponding to the sub-pixel of the first colour unchanged;

when the operating temperature of the current detection is not equal to the operating temperature of the most recent detection, and when an absolute value of the potential difference value is less than a preset step value, determining, according to the second correspondence, that the gamma look-up table corresponding to the sub-pixel of the first colour is the gamma look-up table corresponding to the operating temperature of the current detection; when the operating temperature of the current detection is not equal to the operating temperature of the most recent detection, and when the absolute value of the potential difference value is greater than or equal to the step value, adjusting the gamma look-up table corresponding to the sub-pixel of the first colour to be a target gamma look-up table; where the target gamma look-up table is: the linear brightness column in the gamma look-up table corresponding to the current frame for the sub-pixel of the first colour is kept unchanged, while for the data signal column, a data signal of each frame Vdata($F_n$) is calculated according to the following linear difference value:

$$\frac{VSS(F_n) - VSS(F_{n-1})}{VSS(T_n) - VSS(F_{n-1})} = \frac{Vdata(F_n) - Vdata(F_{n-1})}{Vdata(T_n) - Vdata(F_{n-1})}$$

where VSS($T_n$) is the current cathode potential corresponding to the display device at the operating temperature of the current detection, VSS($F_n$) is the cathode potential corresponding to the display device at the current frame, VSS($F_{n-1}$) is the cathode potential corresponding to the display device at the most recent frame, Vdata($T_n$) is the data signal of each order corresponding to the sub-pixel of the first colour at the operating temperature of the current detection, Vdata ($F_n$) is the data signal of each order corresponding to the sub-pixel of the first colour at the current frame, and Vdata($F_{n-1}$) is the data signal of each order corresponding to the sub-pixel of the first colour at the most recent frame;

in a case where the operating temperature of the current detection is regarded as the high operating temperature, adjusting the gamma look-up table corresponding to the sub-pixel of the first colour to change to the high-temperature gamma look-up table; and in a case where the operating temperature of the current detection is lower than the lowest temperature of the standard operating temperature range, controlling the gamma look-up table corresponding to the sub-pixel of the first colour to change to a gamma look-up table corresponding to the lowest operating temperature of the standard operating temperature range.

Illustratively, at a factory setting stage, a second correspondence between m groups of operating temperatures and gamma look-up tables LUT for the sub-pixel of the first color within a standard operating temperature range (SPEC) is configured; at the factory setting stage, a set of a specific temperature and a high-temperature gamma look-up table corresponding to the sub-pixel of the first color at the high operating temperature is configured. Illustratively, temperatures higher than the highest temperature of the standard operating temperature range are all regarded as the high operating temperature.

Illustratively, in a case that the operating temperature of the current detection is within the standard operating temperature range, and when the operating temperature of the current detection is equal to the operating temperature of the most recent detection, the gamma look-up table for the sub-pixel of the first color at the current frame maintains the gamma look-up table at a previous frame.

It is noted that in a case that the hardware bit width of the display device is 10 bits, the gamma look-up table includes 1024 rows, a brightness column and a data signal column, and calculated data signals of each order are 1024 data signals corresponding to 1024 rows.

It is noted that when calculating the Xth order data signal Vdata($F_n$) corresponding to the current frame according to the above equation, the Vdata($F_{n-1}$) and the Vdata($T_n$) is also substituted into the corresponding Xth order data signal.

Illustratively, in a case where the operating temperature of the current detection is regarded as the high operating temperature, a frame of black image (GL0) is introduced, and in the process of displaying the black image, the cathode potential of the display device is greatly reduced to a specific high-temperature cathode potential, while the gamma look-up table of the sub-pixel of the first color is adjusted to be the high-temperature gamma look-up table so as to reduce the display device power consumption; from the next frame, the cathode potential of the display device remains at the high-temperature cathode potential and the sub-pixel of the first color always uses the high-temperature gamma look-up table as long as the temperature is not restored to be within the SPEC.

In a case where the operating temperature of the current detection is lower than the lowest grayscale of the standard operating temperature range, namely, in a case that the detected operating temperature is too low, if the cathode potential is decreased too much, it is easy to cause the display device to be not dark enough at a low grayscale. Therefore, the cathode potential corresponding to the lowest temperature of the SPEC can be taken as the cathode potential at this state, and the gamma look-up table of the sub-pixel of the first color is adjusted to be the gamma look-up table corresponding to the lowest operating temperature of the standard operating temperature range.

In the display compensating method provided by the above-mentioned embodiments, the cathode potential adjustment, gamma look-up table adjustment and data signal compensation can be performed according to a real-time temperature change, so that the cathode potential and the data signal can transition more smoothly. In addition, the display compensating method provided by the above-mentioned embodiments provides different compensation and adjustment schemes for over-temperature and low-temperature, so that display device can achieve a precise display at different operating temperatures.

It is noted that the display compensating method provided by said embodiments compensates for the data signal by taking the operating temperature into account, as a higher voltage is required at a higher temperature for realizing the same brightness.

Figure 3:
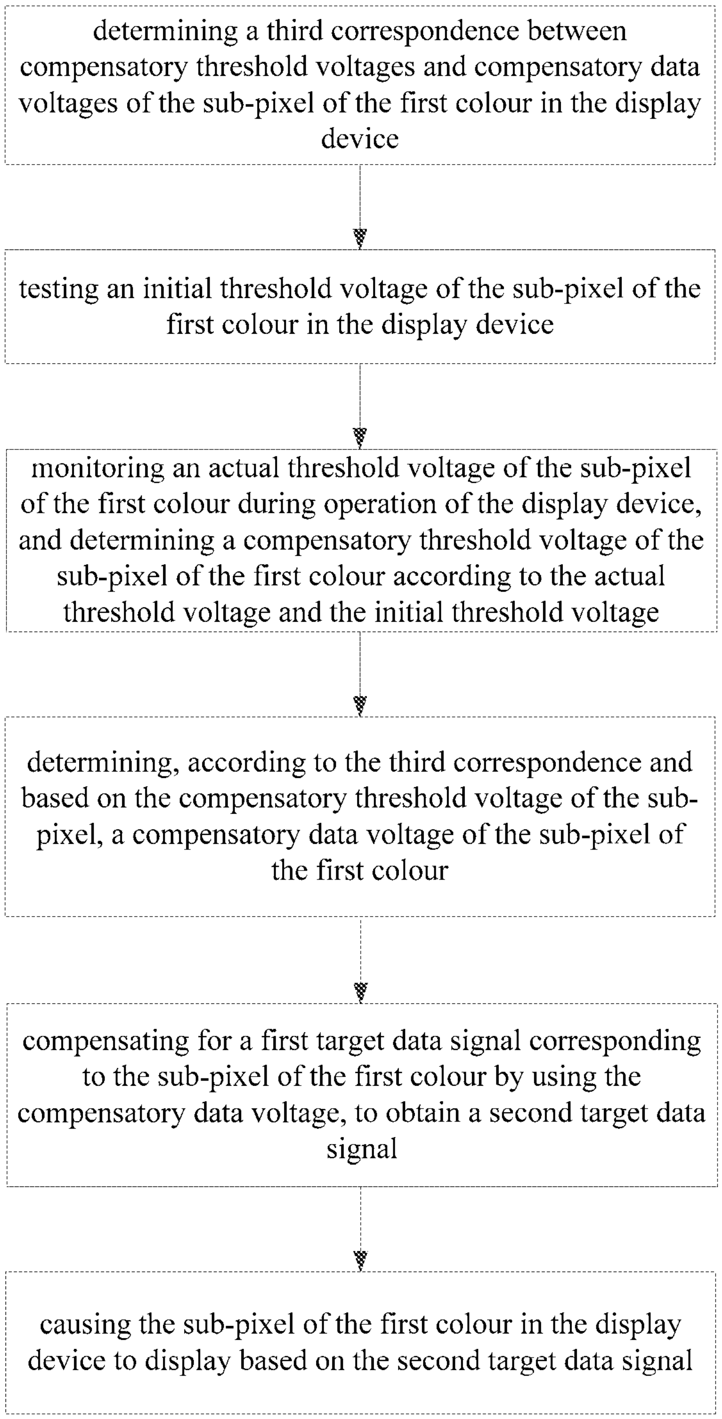
FIG. 3 is a third flow diagram of the display compensating method provided by an embodiment of the present disclosure.

As shown in FIG. 3, in some embodiments, the step of compensating for the threshold voltage corresponding to each sub-pixel in the display device specifically includes:

determining a third correspondence between compensatory threshold voltages and compensatory data voltages of the sub-pixel of the first colour in the display device;

testing an initial threshold voltage of the sub-pixel of the first colour in the display device;

monitoring an actual threshold voltage of the sub-pixel of the first colour during operation of the display device, and determining an compensatory threshold voltage of the sub-pixel of the first colour according to the actual threshold voltage and the initial threshold voltage;

determining a compensatory data voltage of the sub-pixel of the first colour according to the third correspondence based on the compensatory threshold voltage of the sub-pixel;

compensating for the first target data signal corresponding to the sub-pixel of the first colour by using the compensatory data voltage to obtain a second target data signal; and the sub-pixel of the first colour in the display device displays based on the second target data signal.

Illustratively, at a factory setting stage, a factory threshold voltage state (i.e. initial threshold voltage) of the sub-pixel of the first color is tested by using a threshold voltage sensor, and a two-dimensional LUT is generated, and by the two-dimensional LUT, an initial threshold voltage of the sub-pixel of the first color can be found through a row position data and a column position data of the sub-pixel of the first color. A third correspondence between compensatory threshold voltages ΔVth of the sub-pixel of the first color in the display device and compensatory data voltages ΔVdataVth is measured to form a one-dimensional LUT of $\Delta$Vth–$\Delta$Vdata$_{Vth}$, which is stored in a Flash memory;

Illustratively, actual threshold voltages of all the sub-pixels of the first color are detected frame by frame, and are compared with a corresponding initial threshold voltage. Threshold voltage differences for all the sub-pixels of the first color obtained by calculation, so as to obtain compensatory threshold voltages ΔVth for which all the sub-pixels of the first color need to be compensated; with reference to the one-dimensional look-up table $\Delta$Vth–$\Delta$Vdata$_{Vth}$, compensatory data voltages $\Delta$Vdata$_{Vth}$ corresponding to all the sub-pixels of the first color are obtained and then stored in a RAM. Subsequently, a corresponding compensation is performed to obtain a second target data signal Vdata$_{final}$+Vdata$_{temp}$+$\Delta$Vdata$_{Vth}$. Illustratively, the compensatory data voltage $\Delta$Vdata$_{Vth}$ is a positive value.

Illustratively, a second target data signal Vdata$_{final}$ value on which the compensation is performed may be inputted to an AR display module, so that the sub-pixel of the first color in the display device can perform a precise display based on the second target data signal Vdata$_{final}$.

In the display compensating method provided by the above-mentioned embodiments, the threshold voltage state of the sub-pixel can be monitored in real time; by comparing the factory threshold voltage of each sub-pixel with the actual threshold voltage of each sub-pixel, ΔVth is determined. Further, a data signal compensation is performed on the threshold voltage drift of the sub-pixel according to the $\Delta$Vth–$\Delta$Vdata$_{Vth}$ look-up table, so that the display device can achieve a precise display.

In some embodiments, the display compensating method further includes: storing the second target data signal corresponding to each sub-pixel at a frame before the display device is in a power-failure state, for use by the display device in the next power-on state.

Illustratively, at the frame before the display device is in the power-failure state, the second target data signal corresponding to each sub-pixel is stored in a Flash memory in a form of a two-dimensional LUT (namely, according to row position data and column position data of each sub-pixel, a second target data signal corresponding to the sub-pixel can be determined from the two-dimensional LUT), so as to ensure a storage at a power-failure, thereby facilitating a rewritten into a RAM for compensation when the display device is in a next power-on state.

In some embodiments, the step of compensating for the threshold voltage corresponding to each sub-pixel in the display device specifically includes the following.

The display device is divided into a plurality of blocks arranged in an array, where each block includes a plurality of sub-pixels of a first colour, and each block corresponds to one compensatory data voltage.

A target block to which a compensatory sub-pixel of a first colour in the display device belongs, first, second and third blocks that are closest to the compensatory sub-pixel are arranged in an array of 2*2.

A distance between the compensatory sub-pixel and a center point of the target block is D1.

A distance between the compensatory sub-pixel and a center point of the first block is D2.

A distance between the compensatory sub-pixel and a center point of the second block is D3.

A distance between the compensatory sub-pixel and a center point of the third block is D4.

The compensatory data voltage y of the compensatory sub-pixel is:

$$y = \frac{y_1' * L_4' + y_2' * L_3' + y_3' * L_2' + y_4' * L_1'}{L_1' + L_2' + L_3' + L_4'}$$

$L'_1$ is a minimum value in D1, D2, D3 and D4;

$L'_4$ is a maximum value in D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

$y'_1$ is a compensatory data voltage of a block corresponding to the minimum value;

$y'_2$ is a compensatory data voltage of a block corresponding to the smaller value;

$y'_3$ is a compensatory data voltage of a block corresponding to the larger value;

$y'_4$ is a compensatory data voltage of a block corresponding to the maximum value; and A first target data signal corresponding to the compensatory sub-pixel is compensated for by using the compensatory data voltage to obtain a second target data signal; the compensatory sub-pixel displays based on the second target data signal.

Illustratively, the display device is divided into a plurality of blocks arranged in an array, each block includes a plurality of sub-pixels arranged in an array, the plurality of sub-pixels includes a plurality of sub-pixels of a first colour; illustratively, the plurality of sub-pixels can be divided into n rows and n columns.

Illustratively, a plurality of sub-pixels belonging to a block shares an initial threshold voltage and share an actual threshold voltage. ΔVth corresponding to the block is determined based on the initial threshold voltage and the actual threshold voltage; and then according to ΔVth and a ΔVth−$\Delta Vdata_{Vth}$ look-up table, a compensatory data voltage corresponding to the block is determined. Illustratively, said initial threshold voltage and said actual threshold voltage may be selected as an initial threshold voltage and an actual threshold voltage corresponding to a sub-pixel at a center point of the block.

It is noted that the block corresponding to the minimum value is such a block: a distance between a center point of said block and the compensatory sub-pixel is the minimum value. The block corresponding to the smaller value is such a block: a distance between a center point of said block and the compensatory sub-pixel is the second smallest value. The block corresponding to the larger value is such a block: a distance between a center point of said block and the compensatory sub-pixel is the second largest value. The block corresponding to the minimum value is such a block: a distance between a center point of said block and the compensatory sub-pixel is the maximum value. In addition, the above-mentioned y value is calculated by a distance weight, the smaller the distance is, the larger the weight is.

Figure 4:
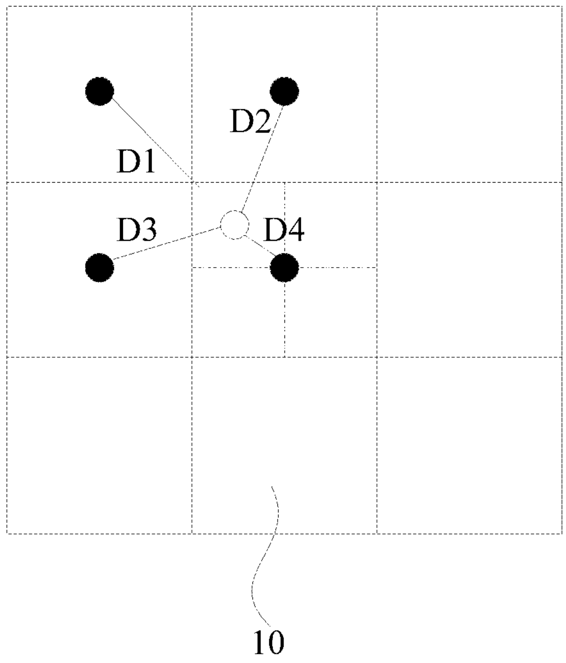
FIG. 4 is a first schematic diagram of a compensatory sub-pixel in block provided by tan embodiment of the present disclosure.
Figure 5:
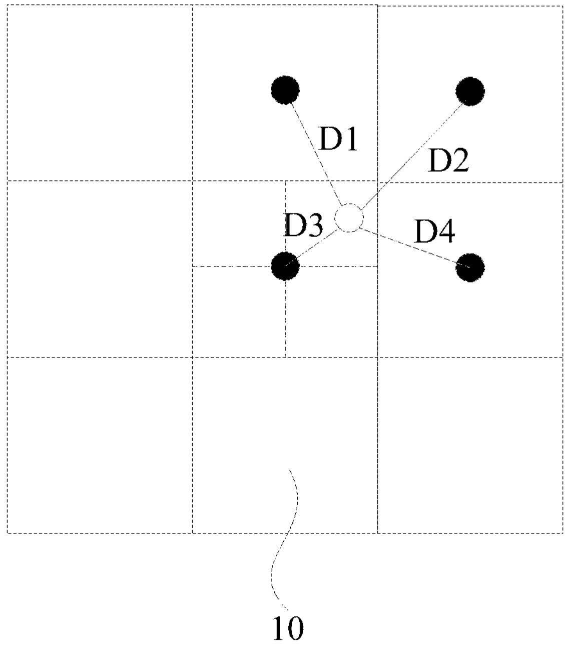
FIG. 5 is a second schematic diagram of a compensatory sub-pixel in a block provided by an embodiment of the present disclosure.
Figure 6:
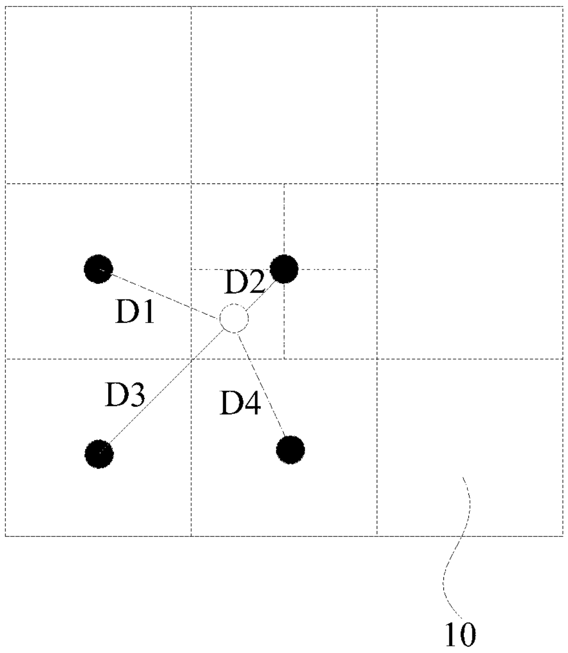
FIG. 6 is a third schematic diagram of a compensatory sub-pixel in a block provided by an embodiment of the present disclosure.
Figure 7:
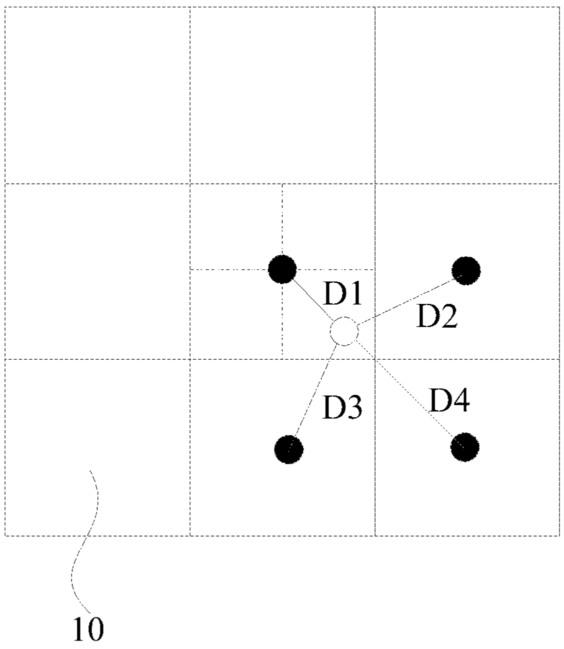
FIG. 7 is a fourth schematic diagram of a compensatory sub-pixel in a block provided by an embodiment of the present disclosure.

It is noted that FIG. 4 illustrates that the compensatory sub-pixel is located in the upper left part of the target block, FIG. 5 illustrates that the compensatory sub-pixel is located in the upper right part of the target block, FIG. 6 illustrates that the compensatory sub-pixel is located in the lower left part of the target block, and FIG. 7 illustrates that the compensatory sub-pixel is located in the lower right part of the target block. It is noted that in FIGS. 4 to 7, the black origin point represents the center point of the block 10, and the white origin point represents the compensatory sub-pixel.

In the display compensating method provided by the above-mentioned embodiment, by a compensation manner of blocks division, a compensatory data voltage corresponding to a compensatory sub-pixel is calculated and obtained through a distance weight and using a compensatory data voltage corresponding to each block, and then a second target data signal is obtained by compensating for a first target data signal corresponding to the compensatory sub-pixel using the compensatory data voltage; the compensatory sub-pixel displays based on the second target data signal. Therefore, in the display compensating method provided by the above-mentioned embodiments, a case that a corresponding compensatory data voltage is stored for each compensatory sub-pixel can be avoided, which not only reduces the hardware memory consumption and effectively reduces the power consumption, but also ensures a precise display of the display device.

In some embodiments, the step of converting the received grayscale signal into a brightness signal; and performing an optical compensation on the display brightness of the display device based on the brightness signal specifically includes:

providing at least two sets of first grayscale signals to the display device;

obtaining an actual brightness and a target brightness of a sub-pixel of a first colour corresponding to each set of first grayscale signals in a case that a lens is not added to a display device, and obtaining at least two first relationship equations corresponding to the sub-pixel of the first colour z1=a1*x+b1; where x represents the actual brightness, z1 represents the target brightness, a1 represents a first optical compensation factor, b1 represents a first optical offset; and obtaining at least one set of a1 and b1 according to the at least two first relationship equations;

providing at least two sets of second grayscale signals to the display device;

obtaining a to-be-displayed brightness of the sub-pixel of the first colour corresponding to each set of first grayscale signal in a case that a lens is not added to the display device; performing, based on the to-be-displayed brightness, a sub-pixel rendering on the sub-pixel to obtain a first applied display brightness of the sub-pixel of the first colour corresponding to each set of second grayscale signals;

substituting the first applied display brightness into x of the first relationship equation to obtain a first modified brightness z1' of the sub-pixel of the first colour in the display device corresponding to each set of second grayscale signals, z1'=a1*x+b1;

obtaining an actual brightness of the sub-pixel of the first colour corresponding to each set of second grayscale signals in a case that a lens is added to the display device; determining, according to the actual brightness, a target brightness of the sub-pixel of the first colour corresponding to each set of second grayscale signals; performing, based on the target brightness, a sub-pixel rendering on the sub-pixel to obtain a second applied display brightness of the sub-pixel of the first colour corresponding to each set of second grayscale signals;

substituting the second applied display brightness into x of the first relationship equation to obtain a second modified brightness z1" of the sub-pixel of the first colour in the display device corresponding to each set of second grayscale signals, z1"=a1*x+b1;

obtaining, based on the first modified brightness and the second modified brightness of the sub-pixel of the first colour corresponding to each of the at least two sets of second grayscale signals, at least two second relationship equations corresponding to the sub-pixel of the first colour, z1"=a2*z1'+b2; wherein z1' represents the first modified brightness, z1" represents the second modified brightness, a2 represents a second optical compensation factor, b2 represents a second optical offset; obtaining at least one set of a2 and b2 according to the at least two second relationship equations; and substituting z1=a1*x+b1 into z1' of z1"=a2*z1'+b2 to obtain z1"=ax+b; where a=a1*a2, b=a2*b1+b2, a represents a third optical compensation factor, b represents a third optical offset.

Illustratively, taking the first color includes a red colour as an example, the at least two sets of first grayscale signals include (R255, G0, B0), (R100, G0, B0). Illustratively, the second grayscale signal is the same as or different from the first grayscale signal.

Illustratively, an actual brightness of the sub-pixel of the first color in the display device corresponding to each set of first grayscale signal is obtained by photographing with a camera.

Illustratively, the display device is provided with two sets of first grayscale signals, and an actual brightness and a target brightness of the sub-pixel of the first color corresponding to each set of the first grayscale signals are obtained. A first relationship equation of the actual brightness and the target brightness of the sub-pixel of the first color corresponding to each group of the first grayscale signal, z1=a1*x+b1, is obtained on the basis of the actual brightness and the target brightness of the sub-pixel of the first color corresponding to each group of the first grayscale signal. Two first relationship equations corresponding to the sub-pixel of the first color form simultaneous equations to obtain a set of a1 and b1. After a1 and b1 are determined, an equation in relation to x and z1 can be derived, namely, a corresponding z1 value can be determined from the x value.

Illustratively, in a case that more than two sets of first grayscale signals are provided to the display device, a plurality (more than two) of first relationship equations can be obtained, and multiple sets of a1 and b1 are obtained by calculating according to the plurality of first relationship equations. Illustratively, in a case where the grayscale of the red sub-pixel is between 0 and 49, a corresponding set of a1and b1 is obtained; in a case where the grayscale of the red sub-pixel is between 50 and 100, a corresponding set of a1' and b1' is obtained; and in a case where the grayscale of the red sub-pixel is between 101 and 255, a corresponding set of a1" and b1" is obtained. A specific selection for the optical compensation factor and the optical offset can be determined according to the first grayscale signal.

Illustratively, the EOTF module obtains the to-be-displayed brightness of the sub-pixel of the first color corresponding to each set of second grayscale signals according to each set of second grayscale signals.

Illustratively, the first applied brightness is a display brightness with which the sub-pixel of the first color displays based on the second grayscale signal when actually applied to the display screen.

Illustratively, the first applied display brightness is substituted into x of the first relationship equation to obtain a first modified brightness z1' of the sub-pixel of the first color in the display device corresponding to each set of second grayscale signals, z1'=a1*x+b1; where a1 and b1 take the values calculated above.

Illustratively, an actual brightness of the sub-pixel of the first color in the display device corresponding to each set of second grayscale signals is obtained by photographing with a camera.

Illustratively, the step of determining, according to the actual brightness, a target brightness of a sub-pixel of a first color corresponding to each set of second grayscale signals specifically includes: calculating an average value of actual brightness values of the sub-pixel of the first color in the display device corresponding to each set of the second grayscale signals, and using the average value as the target brightness of the sub-pixel of the first color corresponding to each set of the second grayscale signals.

Illustratively, the second applied display brightness is substituted into x of the first relationship equation to obtain a second modified brightness z1" of the sub-pixel of the first color in the display device corresponding to each set of second grayscale signals, z1"=a1*x+b1; where a1 and b1 take the values calculated above.

Illustratively, at least two second relationship equations corresponding to the sub-pixel of the first color are obtained according to the first modified brightness and the second modified brightness of the sub-pixel of the first color corresponding to each set of second grayscale signals, z1"=a2*z1'+b2; the at least two second relationship equations form simultaneous equations to calculate at least one set of a2 and b2; after a2 and b2 is determined, an equation in relation to z1' and z1" can be obtained.

Illustratively, z1=a1*x+b1 is substituted into z1' of z1"=a2*z1'+b2, to obtain z1"=ax+b; namely, to obtain a relationship equation between the actual brightness x and the second modified brightness z1".

Illustratively, the acquisition of a1, a2, b1, b2, a, and b described above may all be completed at the factory setting stage.

In the display compensating method provided by the above-mentioned embodiment, a uniformity compensation is performed in a case that a lens is not added to the display device, and another uniformity compensation is performed in a case that a lens is added to the display device. In such a manner, the display uniformity of the display device can be improved while ensuring a precise display of the display device.

In some embodiments, the step of performing an optical compensation on the display brightness of the display device based on the brightness signal specifically includes the following.

The display device is divided into a plurality of blocks arranged in an array, where each block includes a plurality of sub-pixels of a first colour, and each block corresponds to one second modified brightness.

A target block to which a compensatory sub-pixel of the first colour in the display device belongs, and first, second and third blocks that are closest to the compensatory sub-pixel are arranged in an array of 2*2.

A distance between the compensatory sub-pixel and a center point of the target block is D1.

A distance between the compensatory sub-pixel and a center point of the first block is D2.

A distance between the compensatory sub-pixel and a center point of the second block is D3.

A distance between the compensatory sub-pixel and a center point of the third block is D4.

The second modified brightness z2 of the compensatory sub-pixel after the compensation is performed is:

$$z2 = \frac{z11'' * L_4' + z12'' * L_3' + z13'' * L_2' + z14'' * L_1'}{L_1' + L_2' + L_3' + L_4'}$$

$L'_1$ is a minimum value in D1, D2, D3 and D4;
$L'_4$ is a maximum value in D1, D2, D3 and D4;
$L'_2$ is a smaller value in D1, D2, D3 and D4 except the minimum value and the maximum value;
$L'_3$ is a larger value in D1, D2, D3 and D4 except the minimum value and the maximum value;
z11" is a second modified brightness of a block corresponding to the minimum value;
z12" is a second modified brightness of a block corresponding to the smaller value;
z13" is a second modified brightness of a block corresponding to the larger value; and
z14" is a second modified brightness of a block corresponding to the maximum value.

Illustratively, the display device is divided into a plurality of blocks arranged in an array, each block includes a plurality of sub-pixels arranged in an array, the plurality of sub-pixels includes a plurality of sub-pixels of a first colour; illustratively, the plurality of sub-pixels can be divided into n rows and n columns.

Illustratively, each block corresponds to a second modified brightness, and each block corresponds to one or more sets of a, b values. Illustratively, the second modified brightness corresponding to each block is a second modified brightness corresponding to a sub-pixel that is located at a center point of that block.

It is noted that the block corresponding to the minimum value is such a block: a distance between a center point of said block and the compensatory sub-pixel is the minimum value. The block corresponding to the smaller value is such a block: a distance between a center point of said block and the compensatory sub-pixel is the second smallest value. The block corresponding to the larger value is such a block: a distance between a center point of said block and the compensatory sub-pixel is the second largest value. The block corresponding to the maximum value is such a block: a distance between a center point of said block and the compensatory sub-pixel is the maximum value. In addition, in a case that z2 value is calculated by using a distance weight, the smaller the distance is, the larger the weight is.

In the display compensating method provided by the above-mentioned embodiments, by a compensation manner of blocks division, the second modified brightness corresponding to the compensatory sub-pixel is obtained through the distance weight and using the second modified brightness corresponding to each block. Therefore, in the display compensating method provided by the above-mentioned embodiments, a case that a corresponding second modified brightness for each compensatory sub-pixel should be stored can be avoided. This can not only reduces the hardware memory consumption and effectively reduces the power consumption, but also ensures a precise display of the display device.

According to embodiments of the present disclosure, a display compensating device is also provided, which includes:

- a first conversion module, configured to convert a received grayscale signal into a brightness signal;
- an optical compensation module, configured to perform an optical compensation on the display brightness of display device based on the brightness signal;
- a second conversion module, configured to convert a corresponding brightness signal after the optical compensation is performed into a voltage signal; and
- an electrical compensation module, configured to compensate for the threshold voltage corresponding to each sub-pixel in the display device based on the voltage signal; and compensating for operating parameters of the display device for the display device at different operating temperatures.

In the display compensating device provided by embodiments of the present disclosure, the optical compensation module can perform the optical compensation on the display device in the linear brightness domain, and the electrical compensation module can perform a compensation on the threshold voltage corresponding to each sub-pixel in the display device in the non-linear voltage domain, and perform a compensation on the operating parameters of the display device for the display device at different operating temperatures. Therefore, the display compensating device provided by embodiments of the present disclosure achieves a general and overall compensation for the display device in both the linear brightness domain and the non-linear voltage domain, and addresses the following issues while ensuring display precision and reducing costs: a poor screen uniformity in a display screen, a change in a sub-pixel grayscale relationship due to a change in ambient temperature, and a screen brightness affected by an ageing offset of a threshold voltage corresponding to the sub-pixel.

In some embodiments, the electrical compensation module is specifically configured to:

- determine first compensation values corresponding to data signals of the sub-pixel of the first colour in the display device at different operating temperatures, and generating a first compensation look-up table between the operating temperatures, the data signals and the first compensation values corresponding to the sub-pixel of the first colour;
- determine a current operating temperature of the display device and a data signal received by the sub-pixel of the first colour;
- determine, according to the first compensation look-up table, a first compensation value corresponding to the data signal received by the sub-pixel of the first colour at the current operating temperature; and
- compensate for the data signal received by the sub-pixel of the first colour by using said first compensation value, so as to obtain a first target data signal corresponding to the sub-pixel of the first colour.

In the display compensating device provided by the above-mentioned embodiment, the data signal can be compensated accordingly with reference to the operating temperature of the display device, which is in favor of a precise display of the display device at different operating temperatures.

In some embodiments, the electrical compensation module is specifically configured to:

- determine a first correspondence between cathode potentials and operating temperatures for the display device within a standard operating temperature; determine a high-temperature cathode potential of the display device at a high operating temperature, the high operating temperature being greater than the highest temperature of the standard operating temperature range;
- detect the operating temperature of the display device for multiple times.
- in a case that the operating temperature of a current detection is within the standard operating temperature range:
- when the operating temperature of the current detection is equal to an operating temperature of a most recent detection, keep the cathode potential of the display device unchanged;
- when the operating temperature of the current detection is not equal to the operating temperature of the most recent detection, determine, according to the first correspondence, a current cathode potential corresponding to the operating temperature of the current detection and a last cathode potential corresponding to the operating temperature of the most recent detection;
- determine a potential difference value between the current cathode potential and the last cathode potential; and in a case where an absolute value of the potential difference value is less than a preset step value, determine that the cathode potential of the display device is the current cathode potential; in a case where the potential difference value is greater than or equal to the step value, and when the operating temperature of the current detection is greater than the operating temperature of the most recent detection, determine that a cathode potential of the display device at a current frame is $VSS(F_{n-1})+stepV$; and in a case where the potential difference value is greater than or equal to the step value, and when the operating temperature of the current detection is less than the operating temperature of the most recent detection, determine that the cathode potential of the display device at the current frame is $VSS(F_{n-1})$–stepV; the $VSS(F_{n-1})$ is a corresponding cathode potential of the display device at a previous frame adjacent to the current frame, and stepV is the step value;

in a case where the operating temperature of the current detection is regarded as the high operating temperature, control the display device to display a black image, and in the process of displaying the black image, control the cathode potential of the display device to change to the high-temperature cathode potential; and in a case that the operating temperature of the current detection is lower than the lowest temperature of the standard operating temperature range, control the cathode potential of the display device to change to a cathode potential corresponding to the lowest operating temperature of the standard operating temperature range.

In the display compensating device provided by the above-mentioned embodiments, the cathode potential of the display device can be adjusted according to the change in the operating temperature of the display device, such that the adjustment of the cathode potential of the display device within the SPEC can change slowly, and thus the overall visual effect of the display device can transition smoothly. Furthermore, the cathode potential of the display device can also be adjusted accordingly in a case that the display device is at the high operating temperature or at a temperature lower than the SPEC, so as to further facilitate a precise display of the display device at different operating temperatures.

In some embodiments, the electrical compensation module is specifically configured to:

determine a second correspondence between gamma look-up tables and operating temperatures for a sub-pixel of a first colour in the display device within a standard operating temperature, and determine a high-temperature gamma look-up table corresponding to the sub-pixel of the first colour at the high operating temperature;

detect the operating temperature of the display device for multiple times;

in a case that an operating temperature of a current detection is within the standard operating temperature range:

when the operating temperature of the current detection is equal to an operating temperature of a most recent detection, keep a gamma look-up table corresponding to the sub-pixel of the first colour unchanged;

when the operating temperature of the current detection is not equal to the operating temperature of the most recent detection, and when the absolute value of the potential difference value is less than the step value of the preset, determine, according to the second correspondence, that the gamma look-up table corresponding to the sub-pixel of the first colour is the gamma look-up table corresponding to the operating temperature of the current detection; when an absolute value of a potential difference value is greater than or equal to the step value, adjust the gamma look-up table corresponding to the sub-pixel of the first colour to be a target gamma look-up table; where for the target gamma look-up table: a linear brightness column of the gamma look-up table corresponding to the sub-pixel of the first colour at the current frame is kept unchanged, and for a data signal column, a data signal of each order $Vdata(F_n)$ is calculated according to the following linear difference value:

$$\frac{VSS(F_n) - VSS(F_{n-1})}{VSS(T_n) - VSS(F_{n-1})} = \frac{Vdata(F_n) - Vdata(F_{n-1})}{Vdata(T_n) - Vdata(F_{n-1})}$$

where $VSS(T_n)$ is the current cathode potential corresponding to the display device at the operating temperature of the current detection, $VSS(F_n)$ is the cathode potential corresponding to the display device at the current frame, $VSS(F_{n-1})$ is the cathode potential corresponding to the display device at the most recent frame, $Vdata(T_n)$ is a data signal of each order corresponding to the sub-pixel of the first colour at the operating temperature of the current detection, $Vdata(F_n)$ is a data signal of each order corresponding to the sub-pixel of the first colour at the current frame, and $Vdata(F_{n-1})$ is a data signal of each order corresponding to the sub-pixel of the first colour at the most recent frame;

in a case where the operating temperature of the current detection is regarded as the high operating temperature, adjust the gamma look-up table corresponding to the sub-pixel of the first colour to change to the high-temperature gamma look-up table; and in a case where the operating temperature of the current detection is lower than the lowest temperature of the standard operating temperature range, control the gamma look-up table corresponding to the sub-pixel the first colour to change to a gamma look-up table corresponding to the lowest operating temperature of the standard operating temperature range.

In the display compensating device provided by the above-mentioned embodiment, a cathode potential adjustment, a gamma look-up table adjustment and a data signal compensation can be performed according to a real-time temperature change, such that the cathode potential and the data signal can transition more smoothly. Further, in the display compensating method provided by the above-mentioned embodiments, different compensation and adjustment schemes for over-temperature and low-temperature are provided, so that display device can achieve a precise display at different operating temperatures.

In some embodiments, the electrical compensation module is specifically configured to:

determine a third correspondence between compensatory threshold voltages and compensatory data voltages of the sub-pixel of the first colour in the display device;

test an initial threshold voltage of the sub-pixel of the first colour in the display device;

monitor an actual threshold voltage of the sub-pixel of the first colour during operation of the display device, and determine an compensatory threshold voltage of the sub-pixel of the first colour according to the actual threshold voltage and initial threshold voltage;

determine a compensatory data voltage of the sub-pixel of the first colour according to the third correspondence and based on the compensatory threshold voltage of the sub-pixel;

compensate for a first target data signal corresponding to the sub-pixel of the first colour by using the compensatory data voltage to obtain a second target data signal; and the sub-pixel of the first colour in the display device displays based on the second target data signal.

In the display compensating device provided by the above-mentioned embodiments, a threshold voltage state of the sub-pixel can be monitored in real time; and ΔVth is determined by comparing the factory threshold voltage of each sub-pixel with the actual threshold voltage of each sub-pixel. The data signal compensation is performed on the threshold voltage drift of the sub-pixel according to a $\Delta Vth-\Delta Vdata_{Vth}$ look-up table, so that the display device can achieve a precise display.

In some embodiments, the electrical compensation module is also specifically configured to:

store the second target data signal corresponding to each sub-pixel at a frame before the display device is in a power-failure state, for use by the display device in a next power-on state.

In some embodiments, the electrical compensation module is specifically configured to perform the followings.

The display device is divided into a plurality of blocks arranged in an array, where each block includes a plurality of sub-pixels of a first colour, and each block corresponds to one compensatory data voltage.

A target block to which a compensatory sub-pixel of a first colour in the display device belongs, and a first block, a second block and a third block that are closest to the compensatory sub-pixel are arranged in an array of 2*2;

A distance between the compensatory sub-pixel and a center point of the target block is D1.

A distance between the compensatory sub-pixel and a center point of the first block is D2.

A distance between the compensatory sub-pixel and a center point of the second block is D3.

A distance between the compensatory sub-pixel and the center point of the third block is D4.

The compensatory data voltage y of the compensatory sub-pixel is:

$$y = \frac{y_1' * L_4' + y_2' * L_3' + y_3' * L_2' + y_4' * L_1'}{L_1' + L_2' + L_3' + L_4'}$$

$L'_1$ is a minimum value in D1, D2, D3 and D4;

$L'_4$ is a maximum value in DI, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

$y'_1$ is a compensatory data voltage of a block corresponding to the minimum value;

$y'_2$ is a compensatory data voltage of a block corresponding to the smaller value;

$y'_3$ is a compensatory data voltage of a block corresponding to the larger value;

$y'_4$ is a compensatory data voltage of a block corresponding to the maximum value.

The electrical compensation module is configured to compensate for a first target data signal corresponding to the compensatory sub-pixel by using the compensatory data voltage to obtain a second target data signal; where the compensatory sub-pixel displays based on the second target data signal.

In the display compensating device provided by the above-mentioned embodiments, by a compensation manner of blocks division, the second target data signal corresponding to the compensatory sub-pixel is calculated through distance weight and using the second target data signal corresponding to each block. Therefore, in the display compensating method provided by the above-mentioned embodiments, a case that a corresponding second target data signal stored for each compensatory sub-pixel can be avoided, which not only reduces the hardware memory consumption and effectively reduces the power consumption, but also ensures a precise display of the display device.

In some embodiments, the optical compensation module is specifically configured to:

provide at least two sets of first grayscale signals to the display device;

obtain an actual brightness and a target brightness of a sub-pixel of a first colour corresponding to each set of first grayscale signals in a case that a lens is not added to a display device, and obtain at least two first relationship equations corresponding to the sub-pixel of the first colour, z1=a1*x+b1; where x represents the actual brightness, z1 represents the target brightness, a1 represents a first optical compensation factor, b1 represents a first optical offset; and obtain at least one set of a1 and b1 according to the at least two first relationship equation;

provide at least two sets of second grayscale signals to the display device;

obtain a to-be-displayed brightness of the sub-pixel of the first colour corresponding to each set of second grayscale signals in a case that the lens is not added to the display device; perform, based on the to-be-displayed brightness, a sub-pixel rendering on the sub-pixel to obtain a first applied display brightness of the sub-pixel of the first colour corresponding to each set of second grayscale signals;

substitute the first applied display brightness into x of the first relationship equation to obtain a first modified brightness z1' of the first colour in the display device corresponding to each set of second grayscale signals, z1'=a1*x+b1;

obtain an actual brightness of the sub-pixel of the first colour corresponding to each set of second grayscale signals in a case that the lens is added to a display device; determine, according to said actual brightness, a target brightness of the sub-pixel of the first colour corresponding to each set of second grayscale signals; perform, based on the target brightness, a sub-pixel rendering on the sub-pixel to obtain a second applied display brightness of the sub-pixel of the first colour corresponding to each set of second grayscale signals;

substitute the second applied display brightness into x of the first relationship equation to obtain a second modified brightness z1" of the sub-pixel of the first colour in the display device corresponding to each set of second grayscale signals, z1"=a1*x+b1;

obtain, based on the first modified brightness and the second modified brightness of the sub-pixel of the first colour corresponding to each of the at least two sets of second grayscale signals, at least two second relationship equations corresponding to the sub-pixel of the first colour, z1"=a2*z1'+b2; where z1' represents the first modified brightness, z1" represents the second modified brightness, a2 represents a second optical compensation factor, b2 represents a second optical offset; obtain at least one set of a2 and b2 according to the at least two second relationship equations; and substitute z1=a1*x+b1 into z1' of z1"=a2*z1'+b2 to obtain z1"=ax+b; where a=a1*a2, b=a2*b1+b2, a represents a third optical compensation factor, b represents a third optical offset.

In the display compensating device provided by the above-mentioned embodiments, a uniformity compensation is performed in a case that a lens is not added to the display device, and a uniformity compensation is performed in a case that a lens is added to the display device, which effectively improves the display uniformity of the display device while ensures a precise display of the display device.

In some embodiments, the optical compensation module is specifically configured to perform the followings.

The display device is divided into a plurality of blocks arranged in an array, where each block includes a plurality of sub-pixels of a first colour, and each block corresponds to a second modified brightness.

A target block to which a compensatory sub-pixel of the first colour in the display device belongs, a first block, a second block and a third block that are closest to the compensatory sub-pixel are arranged in an array of 2*2.

A distance between the compensatory sub-pixel and a center point of the target block is D1.

A distance between the compensatory sub-pixel and a center point of the first block is D2.

A distance between the compensatory sub-pixel and a center point of the second block is D3.

A distance between the compensatory sub-pixel and a center point of the third block is D4.

The second modified brightness z2 of the compensatory sub-pixel after the compensation is performed is:

$$z2 = \frac{z11'' * L_4' + z12'' * L_3' + z13'' * L_2' + z14'' * L_1'}{L_1' + L_2' + L_3' + L_4'}$$

$L'_1$ is a minimum value in D1, D2, D3 and D4;

$L'_4$ is a maximum value in D1, D2, D3 and D4;

$L'_2$ is a smaller value in D1, D2, D3 and D4 except the minimum value and the maximum value;

$L'_3$ is a larger value in DI, D2, D3 and D4 except the minimum value and the maximum value;

z11" is a second modified brightness of a block corresponding to the minimum value;

z12" is a second modified brightness of a block corresponding to the smaller value;

z13" is a second modified brightness of a block corresponding to the larger value; and z14" is a second modified brightness of a block corresponding to the maximum value.

In embodiments of the present disclosure, a display device is also provided. The display device includes the display compensating device provided by embodiments described above.

In the display compensating device provided by the above-mentioned embodiments, the optical compensation module can perform an optical compensation on the display device in the linear brightness domain, and the electrical compensation module can perform a compensation on the threshold voltage corresponding to each sub-pixel in the display device in the non-linear voltage domain, and perform compensation on the operating parameters of the display device for the display device at different operating temperatures. Therefore, the display compensating device provided by the embodiments of the present disclosure achieves a general and overall compensation for the display device in both the linear brightness domain and the non-linear voltage domain, and addresses the following issues while ensuring display precision and reducing costs: a poor screen uniformity in a display screen, a change in a sub-pixel grayscale relationship due to a change in ambient temperature changing and the screen brightness affected by an ageing offset of threshold voltage corresponding to the sub-pixel.

Accordingly, in a case that the display device provided by embodiments of the present disclosure includes the above-mentioned display compensating device, said display device also has the above-mentioned advantages, and will not be described in detail herein.

It is noted the display device may be any product or component with display function such as a television, a displayer, a digital photo frame, a mobile phone and a tablet computer.

Embodiments of the present disclosure also provides a display device, including: a processor and a memory, where the memory stores computer executable instructions, and the computer executable instructions, when being executed by the processor, cause the processor to perform the display compensating method provided by the above-mentioned embodiments.

Specifically, the computer executable instructions, when being executed by the processor, implements the following steps:

converting a received grayscale signal into a brightness signal;

performing an optical compensation on a display brightness of the display device based on the brightness signal;

converting a corresponding brightness signal after the optical compensation is performed into a voltage signal;

compensating for a threshold voltage corresponding to each sub-pixel in the display device based on the voltage signal; and compensating for operating parameters of the display device for the display device at different operating temperatures.

Optionally, the step of compensating for the operating parameters of the display device for the display device at different operating temperatures specifically includes:

determining first compensation values corresponding to data signals of the sub-pixel of the first colour in the display device for the display device at different operating temperatures, and generating a first compensation look-up table between the operating temperatures, the data signals and the first compensation values corresponding to the sub-pixel of the first colour;

determining a current operating temperature of the display device and a data signal received by the sub-pixel of the first colour;

determining, according to the first compensation look-up table, a first compensation value corresponding to the data signal received by the sub-pixel of the first colour at the current operating temperature; and compensating for the data signal received by the sub-pixel of the first colour by using the first compensation value, so as to obtain a first target data signal corresponding to the sub-pixel of the first colour.

Optionally, the step of compensating for the operating parameters of the display device for the display device at different operating temperatures specifically includes:

determining a first correspondence between cathode potentials and operating temperatures for the display device within a standard operating temperature; determining a high-temperature cathode potential for the display device at a high operating temperature, the high operating temperature being greater than the highest temperature of the standard operating temperature range;

detecting the operating temperature of the display device for multiple times;

in a case that an operating temperature of a current detection is within the standard operating temperature range:

when the operating temperature of the current detection is equal to an operating temperature of a most recent detection, keeping the cathode potential of the display device unchanged;

when the operating temperature of the current detection is not equal to the operating temperature of the most recent detection, determining, according to the first correspondence, a current cathode potential corresponding to the operating temperature of the current detection and a last cathode potential corresponding to the operating temperature of the most recent detection;

determining a potential difference value between the current cathode potential and the last cathode potential, and in a case where an absolute value of the potential difference value is less than a preset step value, determining that the cathode potential of the display device is the current cathode potential; in a case where the potential difference value is greater than or equal to the step value, and when the operating temperature of the current detection is greater than the operating temperature of the most recent detection, determining that the cathode potential of the display device at a current frame is $VSS(F_{n-1})+stepV$, in a case where the potential difference value is greater than or equal to the step value, and when the operating temperature of the current detection is less than the operating temperature of the most recent detection, determining that the cathode potential of the display device at the current frame is $VSS(F_{n-1})-stepV$; where the $VSS(F_{n-1})$ is a corresponding cathode potential of the display device at a previous frame adjacent to the current frame, and stepV is the step value;

in a case where the operating temperature of the current detection is regarded as the high operating temperature, controlling the display device to display a black image, and in the process of displaying the black image, controlling the cathode potential of the display device to change to the high-temperature cathode potential; and in a case that the operating temperature of the current detection is lower than the lowest temperature of the standard operating temperature range, controlling the cathode potential of the display device to change to a cathode potential corresponding to the lowest operating temperature of the standard operating temperature range.

Optionally, the step of compensating for the operating parameters of the display device for the display device at different operating temperatures specifically includes:

determining a second correspondence between gamma look-up tables and operating temperatures for a sub-pixel of a first colour in the display device within a standard operating temperature range; determining a high-temperature gamma look-up table corresponding to the sub-pixel of the first colour at the high operating temperature;

detecting the operating temperature of the display device for multiple times;

in a case that the operating temperature of the current detection is within the standard operating temperature range:

when the operating temperature of the current detection is equal to the operating temperature of the most recent detection, keeping a gamma look-up table corresponding to the sub-pixel of the first colour remaining unchanged;

when the operating temperature of the current detection is not equal to the operating temperature of the most recent detection, and when the absolute value of the potential difference value is less than a preset step value, determining, according to the second correspondence, that the gamma look-up table corresponding to the sub-pixel of the first colour is a gamma look-up table corresponding to the operating temperature of the current detection; when the operating temperature of the current detection is not equal to the operating temperature of the most recent detection, and when the absolute value of the potential difference value is greater than or equal to the step value, adjusting the gamma look-up table corresponding to the sub-pixel of the first colour to be a target gamma look-up table; wherein for the target gamma look-up table: a linear brightness column in a gamma look-up table corresponding to the sub-pixel of the first colour at a current frame is kept unchanged, and in a data signal column, a data signal of each order $Vdata(F_n)$ is calculated according to the following linear difference value:

$$\frac{VSS(F_n)-VSS(F_{n-1})}{VSS(T_n)-VSS(F_{n-1})}=\frac{Vdata(F_n)-Vdata(F_{n-1})}{Vdata(T_n)-Vdata(F_{n-1})}$$

wherein $VSS(T_n)$ is a current cathode potential corresponding to the display device at the operating temperature of the current detection, $VSS(F_n)$ is a cathode potential corresponding to the display device at the current frame, $VSS(F_{n-1})$ is a cathode potential corresponding to the display device at the most recent frame, $Vdata(T_n)$ is a data signal of each order corresponding to the sub-pixel of the first colour at the operating temperature of the current detection, $Vdata(F_n)$ is a data signal of each order corresponding to the sub-pixel of the first colour at the current frame, and $Vdata(F_{n-1})$ is a data signal of each order corresponding to the sub-pixel of the first colour at the most recent frame;

in a case where the operating temperature of the current detection is regarded as the high operating temperature, adjusting the gamma look-up table corresponding to the sub-pixel of the first colour to change to the high-temperature gamma look-up table; and in the case where the operating temperature of the current detection is lower than the lowest temperature of the standard operating temperature range, controlling the gamma look-up table corresponding to the sub-pixel of the first colour to change to a gamma look-up table corresponding to the lowest operating temperature of the standard operating temperature range.

Optionally, the step of compensating for the threshold voltage corresponding to each sub-pixel in the display device specifically includes:

determining a third correspondence between compensatory threshold voltages and compensatory data voltages of the sub-pixel of the first colour in the display device;

testing an initial threshold voltage of the sub-pixel of the first colour in the display device;

monitoring an actual threshold voltage of the sub-pixel of the first colour during operation of the display device, and determining a compensatory threshold voltage of the sub-pixel of the first colour according to the actual threshold voltage and the initial threshold voltage;

determining, according to the third correspondence and based on the compensatory threshold voltage of the sub-pixel, a compensatory data voltage of the sub-pixel of the first colour;

compensating for a first target data signal corresponding to the sub-pixel of the first colour by using the compensatory data voltage, to obtain a second target data signal; and the sub-pixel of the first colour in the display device displays based on the second target data signal.

Optionally, the display compensating method further includes:

storing the second target data signal corresponding to each sub-pixel at a frame before the display device is in a power-failure state, for use by the display device when being in a next power-on state.

Optionally, the step of compensating for the threshold voltage corresponding to each sub-pixel in the display device specifically includes the following.

The display device is divided into a plurality of blocks arranged in an array, wherein each block comprises a plurality of sub-pixels of the first colour, and each block corresponds to one compensatory data voltage.

A target block to which a compensatory sub-pixel of the first colour in the display device belongs, a first block, a second block and a third block that are closest to the compensatory sub-pixel are arranged in in an array of 2*2.

A distance between the compensatory sub-pixel and a center point of the target block is D1.

A distance between the compensatory sub-pixel and a center point of the first block is D2.

A distance between the compensatory sub-pixel and a center point of the second block is D3.

A distance between the compensatory sub-pixel and a center point of the third block is D4;

The compensatory data voltage y of the compensatory sub-pixel is:

$$y = \frac{y_1' * L_4' + y_2' * L_3' + y_3' * L_2' + y_4' * L_1'}{L_1' + L_2' + L_3' + L_4'}$$

$L'_1$ is a minimum value in D1, D2, D3 and D4;

$L'_4$ is a maximum value in D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

$y'_1$ is a compensatory data voltage of a block corresponding to the minimum value;

$y'_2$ is a compensatory data voltage of a block corresponding to the smaller value;

$y'_3$ is a compensatory data voltage of a block corresponding to the larger value; and $y'_4$ is a compensatory data voltage of a block corresponding to the maximum value;

compensating for a first target data signal corresponding to the compensatory sub-pixel by using a compensatory data voltage, to obtain a second target data signal; wherein the compensatory sub-pixel displays based on the second target data signal.

Optionally, the step of converting the received grayscale signal into the brightness signal; and performing the optical compensation on the display brightness of the display device based on the brightness signal specifically includes:

providing at least two sets of first grayscale signals to the display device;

obtaining an actual brightness and a target brightness of the sub-pixel of the first colour corresponding to each set of first grayscale signal in a case that a lens is not added to the display device, and obtaining at least two first relationship equations corresponding to the sub-pixel of the first colour, z1=a1*x+b1; wherein x represents the actual brightness, z1 represents the target brightness, a1 represents a first optical compensation factor, b1 represents a first optical offset; and obtaining at least one set of a1 and b1 according to the at least two first relationship equations;

providing at least two sets of second grayscale signals to the display device;

obtaining a to-be-displayed brightness of the sub-pixel of the first colour corresponding to each set of second grayscale signals in a case that a lens is not added to the display device; performing, based on the to-be-displayed brightness, a sub-pixel rendering on the sub-pixel to obtain a first applied display brightness of the sub-pixel of the first colour corresponding to each set of second grayscale signals;

substituting the first applied display brightness into x of the first relationship equation to obtain a first modified brightness z1' of the sub-pixel of the first colour in the display device corresponding to each set of second grayscale signals, z1'=a1*x+b1;

obtaining an actual brightness of the sub-pixel of the first colour corresponding to each set of second grayscale signals in a case that a lens is added to the display device; determining, according to the actual brightness, a target brightness of the sub-pixel of the first colour corresponding to each set of second grayscale signals; performing, based on the target brightness, a sub-pixel rendering on the sub-pixel to obtain a second applied display brightness of the sub-pixel of the first colour corresponding to each set of second grayscale signals;

substituting the second applied display brightness into x of the first relationship equation to obtain a second modified brightness z1" of the sub-pixel of the first colour in the display device corresponding to each set of second grayscale signals, z1"=a1*x+b1;

obtaining, based on the first modified brightness and the second modified brightness of the sub-pixel of the first colour corresponding to each set of second grayscale signals, at least two second relationship equations corresponding to the sub-pixel of the first colour, z1"=a2*z1'+b2; wherein z1' represents the first modified brightness, z1" represents the second modified brightness, a2 represents a second optical compensation factor, b2 represents a second optical offset; obtaining at least one set of a2 and b2 according to the at least two second relationship equations; and substituting z1=a1*x+b1 into z1' of z1"=a2*z1'+b2 to obtain z1"=ax+b; wherein a=a1*a2, b=a2*b1+b2, a represents a third optical compensation factor, b represents a third optical offset.

Optionally, the step of performing an optical compensation on the display brightness of the display device based on the brightness signal specifically includes the following.

The display device is divided into a plurality of blocks arranged in an array, where each block comprises a plurality of sub-pixels of a first colour, and each block corresponds to one second modified brightness.

A target block to which a compensatory sub-pixel of the first colour in the display device belongs, and a first block, a second block and a third block that are closest to the compensatory sub-pixel are arranged in an array of 2*2.

A distance between the compensatory sub-pixel and a center point of the target block is D1.

A distance between the compensatory sub-pixel and a center point of the first block is D2.

A distance between the compensatory sub-pixel and a center point of the second block is D3.

A distance between the compensatory sub-pixel and a center point of the third block is D4.

The second modified brightness z2 for the compensatory sub-pixel that is compensated for is:

$$z2 = \frac{z11'' * L'_4 + z12'' * L'_3 + z13'' * L'_2 + z14'' * L'_1}{L'_1 + L'_2 + L'_3 + L'_4}$$

$L'_1$ is a minimum value of D1, D2, D3 and D4;

$L'_4$ is a maximum value of D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

z11" is a second modified brightness of a block corresponding to the minimum value;

z12" is a second modified brightness of a block corresponding to the smaller value;

z13" is a second modified brightness of a block corresponding to the larger value; and z14" is a second modified brightness of a block corresponding to the maximum value.

In the display device provided by embodiments of the present disclosure, the display device can be optically compensated in the linear brightness domain, and the threshold voltage corresponding to each sub-pixel in the display device can be compensated in the non-linear voltage domain, and the operating parameters of the display device when the display device is at different operating temperatures can be compensated. Therefore, the display compensating method provided by embodiments of the present disclosure realizes a general and overall compensation for the display device in both the linear brightness domain and the non-linear voltage domain, and addresses the following issues of a display screen while ensuring the display precision and reducing costs: a poor screen uniformity, a change in a grayscale relationship of a sub-pixel due to a change in the ambient temperature, and the screen brightness affected by an aging offset of a threshold voltage corresponding to the sub-pixel.

In the display device provided by the embodiments of the present disclosure, a data signal can be compensated for correspondingly with reference to the operating temperature of the display device, thereby facilitating a precise display of the display device at different operating temperatures.

In the display device provided by the embodiments of the present disclosure, the cathode potential of the display device can be adjusted according to a change in the operating temperature of the display device, so that the adjustment of the cathode potential of the display device within the SPEC can be changed slowly, and thus the overall visual effect of the display device can be smoothly transitioned. Furthermore, when the display device is at a high operating temperature or at a temperature lower than the SPEC, the cathode potential of the display device can also be adjusted accordingly, so as to further facilitate a precise display of the display device at different operating temperatures.

In the display device provided by the embodiments of the present disclosure, a cathode potential adjustment, a gamma look-up table adjustment and a data signal compensation can be performed according to a real-time temperature change, and the cathode potential and the data signal can transition more smoothly. Further, in the display compensating method provided by the above-mentioned embodiment, different compensation and adjustment schemes for over-temperature and low-temperature are provided, so that the display device can achieve a precise display at different operating temperatures.

In the display device provided by the embodiments of the present disclosure, a threshold voltage state of the sub-pixel can be monitored in real time, A Vth is determined by comparing a factory threshold voltage with an actual threshold voltage of each sub-pixel, and a data signal compensation is performed on the threshold voltage drift of the sub-pixel according to a $\Delta Vth-\Delta Vdata_{Vth}$ look-up table, so that the display device can achieve a precise display.

In the display device provided by the embodiments of the present disclosure, by a compensation manner of blocks division, a second target data signal corresponding to a compensatory sub-pixel is calculated through a distance weight and using a second target data signal corresponding to each block. Therefore, in the above-mentioned display compensating method provided by the embodiments, a case that a corresponding second target data signal is stored for each compensatory sub-pixel can be avoided. This can not only reduce the hardware memory consumption and effectively reduce the power consumption, but also ensures a precise display of the display device.

In the display device provided by embodiments of the present disclosure, a uniformity compensation is performed before a lens is added to the display device, and another uniformity compensation is performed after the lens is added to the display device, thereby effectively improving a display uniformity of the display device while ensuring a precise display of the display device.

In the display device provided by the embodiments of the present disclosure, by a compensation manner of blocks division, a second modified brightness corresponding to a compensatory sub-pixel is calculated through a distance weight and using a second modified brightness corresponding to each block. Therefore, in the above-mentioned display compensating method provided by the embodiment, a case that a corresponding second modified brightness is stored for each compensatory sub-pixel can be avoided. This can not only reduce the hardware memory consumption and effectively reduce the power consumption, but also ensures a precise display of the display device.

The embodiments of the present disclosure also provides a non-volatile storage medium storing computer executable instructions, the computer executable instructions, when being executed by a processor, implement various processes of the above-mentioned display compensating method implementations provided by the embodiments, which can achieve the same technical effect, and the description thereof is omitted for the sake of conciseness. the computer readable storage medium may be a medium such as read-only memory (ROM), random access memory (RAM), magnetic disk or optical disk, etc.

It should be noted that each embodiment in this specification is described in a progressive manner, the same and similar parts between various embodiments can be referred to each other, and each embodiment focuses on the differences from other embodiment. In particular, with regard to the method embodiment, since it is substantially similar to the product embodiment, the description thereof is relatively simple, and reference can be made to partial description of the product embodiment for the relevant part.

Unless defined otherwise, technical or scientific terms used in this disclosure shall have the ordinary meaning as understood by one of ordinary skill in the art to which this disclosure belongs. The use of "first", "second", and the like in this disclosure does not denote any order, quantity, or importance, but rather is used to distinguish one element from another. The word "comprise" or "include", and the like, means that the presence of an element or item preceding the word encompasses the presence of the element or item listed after the word and equivalents thereof, but does not exclude other elements or items. The terms "connected", "couple", or "connecting", and the like, are not limited to physical or mechanical connections, but may include electrical connections, whether direct or indirect. The terms "upper", "lower", "left", "right" and the like are used only to indicate relative positional relationships, and can change accordingly when the absolute position of the described object changes.

It will be understood that when an element such as a layer, film, region or base plate is referred to as being "on" or "under" another element, it can be "directly on" or "directly under" the other element or intervening elements may be present therebetween.

In the above description of embodiment, particular features, structures, material or characteristics may be combined in any suitable manner in any one or more of the embodiment or examples.

While the foregoing is directed to the particular embodiments of the present disclosure, but the protection scope of the disclosure is not limited thereto. Alterations and changes that can be readily envisaged by those skilled in the art within the technique disclosed by the disclosure should fall within the protection scope of the present disclosure. Accordingly, the protection sought herein is as set forth in the appended claims.

What is claimed is:

1. A display compensating method, applied to a display device, the display compensating method comprising:

converting a received grayscale signal into a brightness signal;

performing an optical compensation on a display brightness of the display device based on the brightness signal;

converting a corresponding brightness signal on which the optical compensation is performed into a voltage signal; and compensating for a threshold voltage corresponding to each sub-pixel in the display device based on the voltage signal; and compensating for, according to an operating temperature change in the display device, operating parameters of the display device for the display device operated at different operating temperatures;

wherein the step of compensating for the operating parameters of the display device for the display device operated at different operating temperatures comprises:

determining a first correspondence between cathode potentials and operating temperatures for the display device within a standard operating temperature; determining a high-temperature cathode potential for the display device at a high operating temperature, the high operating temperature being greater than the highest temperature of the standard operating temperature range;

detecting the operating temperature of the display device for multiple times;

in a case that an operating temperature of a current detection is within the standard operating temperature range:

when the operating temperature of the current detection is equal to an operating temperature of a most recent detection, keeping the cathode potential of the display device unchanged;

when the operating temperature of the current detection is not equal to the operating temperature of the most recent detection, determining, according to the first correspondence, a current cathode potential corresponding to the operating temperature of the current detection and a last cathode potential corresponding to the operating temperature of the most recent detection;

determining a potential difference value between the current cathode potential and the last cathode potential, and in a case where an absolute value of the potential difference value is less than a preset step value, determining that the cathode potential of the display device is the current cathode potential; in a case where the potential difference value is greater than or equal to the step value, and when the operating temperature of the current detection is greater than the operating temperature of the most recent detection, determining that the cathode potential of the display device at a current frame is $VSS(F_{n-1})+stepV$; in a case where the potential difference value is greater than or equal to the step value, and when the operating temperature of the current detection is less than the operating temperature of the most recent detection, determining that the cathode potential of the display device at the current frame is $VSS(F_{n-1})-stepV$; wherein the $VSS(F_{n-1})$ is a corresponding cathode potential of the display device at a previous frame adjacent to the current frame, and stepV is the step value;

in a case where the operating temperature of the current detection is regarded as the high operating temperature, controlling the display device to display a black image, and in the process of displaying the black image, controlling the cathode potential of the display device to change to the high-temperature cathode potential; and in a case that the operating temperature of the current detection is lower than the lowest temperature of the standard operating temperature range, controlling the cathode potential of the display device to change to a cathode potential corresponding to the lowest operating temperature of the standard operating temperature range.

2. The display compensating method according to claim 1, wherein the step of compensating for the operating parameters of the display device for the display device operated at different operating temperatures further comprises:

determining first compensation values corresponding to data signals of a sub-pixel of a first colour in the display device for the display device operated at different operating temperatures, and generating a first compensation look-up table between the operating temperatures, the data signals and the first compensation values corresponding to the sub-pixel of the first colour;

determining a current operating temperature of the display device and a data signal received by the sub-pixel of the first colour;

determining, according to the first compensation look-up table, a first compensation value corresponding to the data signal received by the sub-pixel of the first colour at the current operating temperature; and compensating for the data signal received by the sub-pixel of the first colour by using said first compensation value, to obtain a first target data signal corresponding to the sub-pixel of the first colour.

3. The display compensating method according to claim 1, wherein the step of compensating for the operating parameters of the display device for the display device operated at different operating temperatures comprises:

determining a second correspondence between gamma look-up tables and operating temperatures for a sub-pixel of a first colour in the display device within a standard operating temperature range; determining a high-temperature gamma look-up table corresponding to the sub-pixel of the first colour at the high operating temperature;

detecting the operating temperature of the display device for multiple times;

in a case that the operating temperature of the current detection is within the standard operating temperature range:

when the operating temperature of the current detection is equal to the operating temperature of the most recent detection, keeping a gamma look-up table corresponding to the sub-pixel of the first colour remaining unchanged;

when the operating temperature of the current detection is not equal to the operating temperature of the most recent detection, and when the absolute value of the potential difference value is less than a preset step value, determining, according to the second correspondence, that the gamma look-up table corresponding to the sub-pixel of the first colour is a gamma look-up table corresponding to the operating temperature of the current detection; when the operating temperature of the current detection is not equal to the operating temperature of the most recent detection, and when the absolute value of the potential difference value is greater than or equal to the step value, adjusting the gamma look-up table corresponding to the sub-pixel of the first colour to be a target gamma look-up table; wherein for the target gamma look-up table: a linear brightness column in a gamma look-up table corresponding to the sub-pixel of the first colour at a current frame is kept unchanged, and in a data signal column, a data signal of each order $Vdata(F_n)$ is calculated according to the following linear difference value:

$$\frac{VSS(F_n) - VSS(F_{n-1})}{VSS(T_n) - VSS(F_{n-1})} = \frac{Vdata(F_n) - Vdata(F_{n-1})}{Vdata(T_n) - Vdata(F_{n-1})}$$

wherein $VSS(T_n)$ is a current cathode potential corresponding to the display device at the operating temperature of the current detection, $VSS(F_n)$ is a cathode potential corresponding to the display device at the current frame, $VSS(F_{n-1})$ is a cathode potential corresponding to the display device at the most recent frame, $Vdata(T_n)$ is a data signal of each order corresponding to the sub-pixel of the first colour at the operating temperature of the current detection, $Vdata(F_n)$ is a data signal of each order corresponding to the sub-pixel of the first colour at the current frame, and $Vdata(F_{n-1})$ is a data signal of each order corresponding to the sub-pixel of the first colour at the most recent frame;

in the case where the operating temperature of the current detection is regarded as the high operating temperature, adjusting the gamma look-up table corresponding to the sub-pixel of the first colour to change to the high-temperature gamma look-up table; and in the case where the operating temperature of the current detection is lower than the lowest temperature of the standard operating temperature range, controlling the gamma look-up table corresponding to the sub-pixel of the first colour to change to a gamma look-up table corresponding to the lowest operating temperature of the standard operating temperature range.

4. The display compensating method according to claim 2, wherein the step of compensating for the threshold voltage corresponding to each sub-pixel in the display device further comprises:

determining a third correspondence between compensatory threshold voltages and compensatory data voltages of the sub-pixel of the first colour in the display device;

testing an initial threshold voltage of the sub-pixel of the first colour in the display device;

monitoring an actual threshold voltage of the sub-pixel of the first colour during operation of the display device, and determining a compensatory threshold voltage of the sub-pixel of the first colour according to the actual threshold voltage and the initial threshold voltage;

determining, according to the third correspondence and based on the compensatory threshold voltage of the sub-pixel, a compensatory data voltage of the sub-pixel of the first colour; and compensating for a first target data signal corresponding to the sub-pixel of the first colour by using the compensatory data voltage, to obtain a second target data signal;

wherein the sub-pixel of the first colour in the display device displays based on the second target data signal.

5. The display compensating method according to claim 4, wherein the display compensating method further comprises:

storing the second target data signal corresponding to each sub-pixel at a frame before the display device is in a power-failure state, for use by the display device when being in a next power-on state.

6. The display compensating method according to claim 2, wherein the display device is divided into a plurality of blocks arranged in an array, wherein each block comprises a plurality of sub-pixels of the first colour, and each block corresponds to one compensatory data voltage;

a target block to which a compensatory sub-pixel of the first colour in the display device belongs, a first block, a second block and a third block that are closest to the compensatory sub-pixel are arranged in in an array of 2*2;

a distance between the compensatory sub-pixel and a center point of the target block is D1;

a distance between the compensatory sub-pixel and a center point of the first block is D2;

a distance between the compensatory sub-pixel and a center point of the second block is D3; and a distance between the compensatory sub-pixel and a center point of the third block is D4;

wherein the step of compensating for the threshold voltage corresponding to each sub-pixel in the display device comprises:

determining the compensatory data voltage y of the compensatory sub-pixel by:

$$y = \frac{y_1' * L_4' + y_2' * L_3' + y_3' * L_2' + y_4' * L_1'}{L_1' + L_2' + L_3' + L_4'}$$

wherein $L'_1$ is a minimum value in D1, D2, D3 and D4;

$L'_4$ is a maximum value in D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

$y'_1$ is a compensatory data voltage of a block corresponding to the minimum value;

$y'_2$ is a compensatory data voltage of a block corresponding to the smaller value;

$y'_3$ is a compensatory data voltage of a block corresponding to the larger value; and $y'_4$ is a compensatory data voltage of a block corresponding to the maximum value; and compensating for a first target data signal corresponding to the compensatory sub-pixel by using a compensatory data voltage, to obtain a second target data signal; wherein the compensatory sub-pixel displays based on the second target data signal.

7. The display compensating method according to claim 1, wherein the step of converting the received grayscale signal into the brightness signal; and performing the optical compensation on the display brightness of the display device based on the brightness signal further comprises:

providing at least two sets of first grayscale signals to the display device;

obtaining an actual brightness and a target brightness of the sub-pixel of the first colour corresponding to each of the at least two sets of first grayscale signal in a case that a lens is not added to the display device, and obtaining at least two first relationship equations corresponding to the sub-pixel of the first colour, z1=a1*x+b1; wherein x represents the actual brightness, z1 represents the target brightness, a1 represents a first optical compensation factor, b1 represents a first optical offset; and obtaining at least one set of a1 and b1 according to the at least two first relationship equations;

providing at least two sets of second grayscale signals to the display device;

obtaining a to-be-displayed brightness of the sub-pixel of the first colour corresponding to each of the at least two sets of second grayscale signals in a case that a lens is not added to the display device; performing, based on the to-be-displayed brightness, a sub-pixel rendering on the sub-pixel to obtain a first applied display brightness of the sub-pixel of the first colour corresponding to each of the at least two sets of second grayscale signals;

substituting the first applied display brightness into x of the first relationship equation to obtain a first modified brightness z1" of the sub-pixel of the first colour in the display device corresponding to each of the at least two sets of second grayscale signals, z1"=a1*x+b1;

obtaining an actual brightness of the sub-pixel of the first colour corresponding to each of the at least two sets of second grayscale signals in a case that a lens is added to the display device; determining, according to the actual brightness, a target brightness of the sub-pixel of the first colour corresponding to each of the at least two sets of second grayscale signals; performing, based on the target brightness, a sub-pixel rendering on the sub-pixel to obtain a second applied display brightness of the sub-pixel of the first colour corresponding to each of the at least two sets of second grayscale signals;

substituting the second applied display brightness into x of the first relationship equation to obtain a second modified brightness z1" of the sub-pixel of the first colour in the display device corresponding to each of the at least two sets of second grayscale signals, z1"=a1*x+b1;

obtaining, based on the first modified brightness and the second modified brightness of the sub-pixel of the first colour corresponding to each of the at least two sets of second grayscale signals, at least two second relationship equations corresponding to the sub-pixel of the first colour, z1"=a2*z1'+b2; wherein z1' represents the first modified brightness, z1" represents the second modified brightness, a2 represents a second optical compensation factor, b2 represents a second optical offset; obtaining at least one set of a2 and b2 according to the at least two second relationship equations; and substituting z1=a1*x+b1 into z1' of z1"=a2*z1'+b2 to obtain z1"=ax+b; wherein a=a1*a2, b=a2*b1+b2, a represents a third optical compensation factor, b represents a third optical offset.

8. The display compensating method according to claim 1, wherein the display device is divided into a plurality of blocks arranged in an array, wherein each block comprises a plurality of sub-pixels of a first colour, and each block corresponds to one second modified brightness;

a target block to which a compensatory sub-pixel of the first colour in the display device belongs, and a first block, a second block and a third block that are closest to the compensatory sub-pixel are arranged in an array of 2*2;

a distance between the compensatory sub-pixel and a center point of the target block is D1;

a distance between the compensatory sub-pixel and a center point of the first block is D2;

a distance between the compensatory sub-pixel and a center point of the second block is D3; and a distance between the compensatory sub-pixel and a center point of the third block is D4;

wherein the step of performing an optical compensation on the display brightness of the display device based on the brightness signal comprises:

determining the second modified brightness z2 for the compensatory sub-pixel that is compensated for by:

$$z2 = \frac{z11'' * L_4' + z12'' * L_3' + z13'' * L_2' + z14'' * L_1'}{L_1' + L_2' + L_3' + L_4'}$$

wherein $L'_1$ is a minimum value of D1, D2, D3 and D4;

$L'_4$ is a maximum value of D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

z11" is a second modified brightness of a block corresponding to the minimum value;

z12" is a second modified brightness of a block corresponding to the smaller value;

z13" is a second modified brightness of a block corresponding to the larger value; and z14" is a second modified brightness of a block corresponding to the maximum value.

9. A display compensating device, comprising:

a first conversion module, configured to convert a received grayscale signal into a brightness signal;

an optical compensation module, configured to performing an optical compensation on the display brightness of display device based on the brightness signal;

a second conversion module, configured to convert a corresponding brightness signal after the optical compensation is performed into a voltage signal; and an electrical compensation module, configured to compensate for the threshold voltage corresponding to each sub-pixel in the display device based on the voltage signal, and compensate for, according to an operating temperature change in the display device, operating parameters of the display device for the display device operated at different operating temperatures;

wherein the electrical compensation module is further configured for:

determining a first correspondence between cathode potentials and operating temperatures for the display device within a standard operating temperature; determining a high-temperature cathode potential for the display device at a high operating temperature, the high operating temperature being greater than the highest temperature of the standard operating temperature range;

detecting the operating temperature of the display device for multiple times;

in a case that an operating temperature of a current detection is within the standard operating temperature range:

when the operating temperature of the current detection is equal to an operating temperature of a most recent detection, keeping the cathode potential of the display device unchanged;

when the operating temperature of the current detection is not equal to the operating temperature of the most recent detection, determining, according to the first correspondence, a current cathode potential corresponding to the operating temperature of the current detection and a last cathode potential corresponding to the operating temperature of the most recent detection;

determining a potential difference value between the current cathode potential and the last cathode potential, and in a case where an absolute value of the potential difference value is less than a preset step value, determining that the cathode potential of the display device is the current cathode potential; in a case where the potential difference value is greater than or equal to the step value, and when the operating temperature of the current detection is greater than the operating temperature of the most recent detection, determining that the cathode potential of the display device at a current frame is $VSS(F_{n-1})+stepV$; in a case where the potential difference value is greater than or equal to the step value, and when the operating temperature of the current detection is less than the operating temperature of the most recent detection, determining that the cathode potential of the display device at the current frame is$VSS(F_{n-1})-stepV$; wherein the $VSS(F_{n-1})$ is a corresponding cathode potential of the display device at a previous frame adjacent to the current frame, and stepV is the step value;

in a case where the operating temperature of the current detection is regarded as the high operating temperature, controlling the display device to display a black image, and in the process of displaying the black image, controlling the cathode potential of the display device to change to the high-temperature cathode potential; and in a case that the operating temperature of the current detection is lower than the lowest temperature of the standard operating temperature range, controlling the cathode potential of the display device to change to a cathode potential corresponding to the lowest operating temperature of the standard operating temperature range.

10. A display device, comprising: the display compensating device according to claim 9.

11. A display device, comprising:

a processor and a memory, the memory storing computer executable instructions, the computer executable instructions, when being executed by the processor, cause the processor to perform the steps of the display compensating method according to claim 1.

12. A non-transitory non-volatile computer readable storage medium, storing computer executable instructions, the computer executable instructions, when being executed by a processor, cause the processor to perform the display compensating method according to claim 1.

13. The display device according to claim 11, wherein the step of compensating for the operating parameters of the display device for the display device operated at different operating temperatures comprises:

determining first compensation values corresponding to data signals of a sub-pixel of a first colour in the display device for the display device operated at different operating temperatures, and generating a first compensation look-up table between the operating temperatures, the data signals and the first compensation values corresponding to the sub-pixel of the first colour;

determining a current operating temperature of the display device and a data signal received by the sub-pixel of the first colour;

determining, according to the first compensation look-up table, a first compensation value corresponding to the data signal received by the sub-pixel of the first colour at the current operating temperature; and compensating for the data signal received by the sub-pixel of the first colour by using said first compensation value, to obtain a first target data signal corresponding to the sub-pixel of the first colour.

14. The display device according to claim 11, wherein the step of compensating for the operating parameters of the display device for the display device operated at different operating temperatures comprises:

determining a second correspondence between gamma look-up tables and operating temperatures for a sub-pixel of a first colour in the display device within a standard operating temperature range; determining a high-temperature gamma look-up table corresponding to the sub-pixel of the first colour at the high operating temperature;

detecting the operating temperature of the display device for multiple times;

in a case that the operating temperature of the current detection is within the standard operating temperature range:

when the operating temperature of the current detection is equal to the operating temperature of the most recent detection, keeping a gamma look-up table corresponding to the sub-pixel of the first colour remaining unchanged;

when the operating temperature of the current detection is not equal to the operating temperature of the most recent detection, and when the absolute value of the potential difference value is less than a preset step value, determining, according to the second correspondence, that the gamma look-up table corresponding to the sub-pixel of the first colour is a gamma look-up table corresponding to the operating temperature of the current detection; when the operating temperature of the current detection is not equal to the operating temperature of the most recent detection, and when the absolute value of the potential difference value is greater than or equal to the step value, adjusting the gamma look-up table corresponding to the sub-pixel of the first colour to be a target gamma look-up table; wherein for the target gamma look-up table: a linear brightness column in a gamma look-up table corresponding to the sub-pixel of the first colour at a current frame is kept unchanged, and in a data signal column, a data signal of each order $Vdata(F_n)$ is calculated according to the following linear difference value:

$$\frac{VSS(F_n) - VSS(F_{n-1})}{VSS(T_n) - VSS(F_{n-1})} = \frac{Vdata(F_n) - Vdata(F_{n-1})}{Vdata(T_n) - Vdata(F_{n-1})}$$

wherein $VSS(T_n)$ is a current cathode potential corresponding to the display device at the operating temperature of the current detection, $VSS(F_n)$ is a cathode potential corresponding to the display device at the current frame, $VSS(F_{n-1})$ is a cathode potential corresponding to the display device at the most recent frame, $Vdata(T_n)$ is a data signal of each order corresponding to the sub-pixel of the first colour at the operating temperature of the current detection, $Vdata(F_n)$ is a data signal of each order corresponding to the sub-pixel of the first colour at the current frame, and $Vdata(F_{n-1})$ is a data signal of each order corresponding to the sub-pixel of the first colour at the most recent frame;

in the case where the operating temperature of the current detection is regarded as the high operating temperature, adjusting the gamma look-up table corresponding to the sub-pixel of the first colour to change to the high-temperature gamma look-up table; and in the case where the operating temperature of the current detection is lower than the lowest temperature of the standard operating temperature range, controlling the gamma look-up table corresponding to the sub-pixel of the first colour to change to a gamma look-up table corresponding to the lowest operating temperature of the standard operating temperature range.

15. The display device according to claim 13, wherein the step of compensating for the threshold voltage corresponding to each sub-pixel in the display device further comprises:

determining a third correspondence between compensatory threshold voltages and compensatory data voltages of the sub-pixel of the first colour in the display device;

testing an initial threshold voltage of the sub-pixel of the first colour in the display device;

monitoring an actual threshold voltage of the sub-pixel of the first colour during operation of the display device, and determining a compensatory threshold voltage of the sub-pixel of the first colour according to the actual threshold voltage and the initial threshold voltage;

determining, according to the third correspondence and based on the compensatory threshold voltage of the sub-pixel, a compensatory data voltage of the sub-pixel of the first colour; and compensating for a first target data signal corresponding to the sub-pixel of the first colour by using the compensatory data voltage, to obtain a second target data signal;

wherein the sub-pixel of the first colour in the display device displays based on the second target data signal.

16. The display device according to claim 15, wherein the steps further comprises:

storing the second target data signal corresponding to each sub-pixel at a frame before the display device is in a power-failure state, for use by the display device when being in a next power-on state.

17. The display device according to claim 13, wherein the display device is divided into a plurality of blocks arranged in an array, wherein each block comprises a plurality of sub-pixels of the first colour, and each block corresponds to one compensatory data voltage;

a target block to which a compensatory sub-pixel of the first colour in the display device belongs, a first block, a second block and a third block that are closest to the compensatory sub-pixel are arranged in in an array of 2*2;

a distance between the compensatory sub-pixel and a center point of the target block is D1;

a distance between the compensatory sub-pixel and a center point of the first block is D2;

a distance between the compensatory sub-pixel and a center point of the second block is D3; and a distance between the compensatory sub-pixel and a center point of the third block is D4;

wherein the step of compensating for the threshold voltage corresponding to each sub-pixel in the display device comprises:

determining the compensatory data voltage y of the compensatory sub-pixel by:

$$y = \frac{y'_1 * L'_4 + y'_2 * L'_3 + y'_3 * L'_2 + y'_4 * L'_1}{L'_1 + L'_2 + L'_3 + L'_4}$$

wherein $L'_1$ is a minimum value in D1, D2, D3 and D4;

$L'_4$ is a maximum value in D1, D2, D3 and D4;

$L'_2$ is a smaller value in D1, D2, D3 and D4 except the minimum value and the maximum value;

$L'_3$ is a larger value in D1, D2, D3 and D4 except the minimum value and the maximum value;

$y'_1$ is a compensatory data voltage of a block corresponding to the minimum value;

$y'_2$ is a compensatory data voltage of a block corresponding to the smaller value;

$y'_3$ is a compensatory data voltage of a block corresponding to the larger value; and $y'_4$ is a compensatory data voltage of a block corresponding to the maximum value; and compensating for a first target data signal corresponding to the compensatory sub-pixel by using a compensatory data voltage, to obtain a second target data signal; wherein the compensatory sub-pixel displays based on the second target data signal.

18. The display device according to claim 11, wherein the step of converting the received grayscale signal into the brightness signal; and performing the optical compensation on the display brightness of the display device based on the brightness signal further comprises:

providing at least two sets of first grayscale signals to the display device;

obtaining an actual brightness and a target brightness of the sub-pixel of the first colour corresponding to each of the at least two sets of first grayscale signal in a case that a lens is not added to the display device, and obtaining at least two first relationship equations corresponding to the sub-pixel of the first colour, z1=a1*x+b1; wherein x represents the actual brightness, z1 represents the target brightness, a1 represents a first optical compensation factor, b1 represents a first optical offset; and obtaining at least one set of a1 and b1 according to the at least two first relationship equations;

providing at least two sets of second grayscale signals to the display device;

obtaining a to-be-displayed brightness of the sub-pixel of the first colour corresponding to each of the at least two sets of second grayscale signals in a case that a lens is not added to the display device; performing, based on the to-be-displayed brightness, a sub-pixel rendering on the sub-pixel to obtain a first applied display brightness of the sub-pixel of the first colour corresponding to each of the at least two sets of second grayscale signals;

substituting the first applied display brightness into x of the first relationship equation to obtain a first modified brightness z1' of the sub-pixel of the first colour in the display device corresponding to each of the at least two sets of second grayscale signals, z1'=a1*x+b1;

obtaining an actual brightness of the sub-pixel of the first colour corresponding to each of the at least two sets of second grayscale signals in a case that a lens is added to the display device; determining, according to the actual brightness, a target brightness of the sub-pixel of the first colour corresponding to each of the at least two sets of second grayscale signals; performing, based on the target brightness, a sub-pixel rendering on the sub-pixel to obtain a second applied display brightness of the sub-pixel of the first colour corresponding to each of the at least two sets of second grayscale signals;

substituting the second applied display brightness into x of the first relationship equation to obtain a second modified brightness z1" of the sub-pixel of the first colour in the display device corresponding to each of the at least two sets of second grayscale signals, z1"=a1*x+b1;

obtaining, based on the first modified brightness and the second modified brightness of the sub-pixel of the first colour corresponding to each of the at least two sets of second grayscale signals, at least two second relationship equations corresponding to the sub-pixel of the first colour, z1"=a2*z1'+b2; wherein z1' represents the first modified brightness, z1" represents the second modified brightness, a2 represents a second optical compensation factor, b2 represents a second optical offset; obtaining at least one set of a2 and b2 according to the at least two second relationship equations; and substituting z1=a1*x+b1 into z1' of z1"=a2*z1'+b2 to obtain z1"=ax+b; wherein a=a1*a2, b=a2*b 1+b2, a represents a third optical compensation factor, b represents a third optical offset.

* * * * *